US 11,248,466 B2

(12) United States Patent
Takamura et al.

(10) Patent No.: US 11,248,466 B2
(45) Date of Patent: Feb. 15, 2022

(54) GAS TURBINE

(71) Applicant: MITSUBISHI HITACHI POWER SYSTEMS, LTD., Kanagawa (JP)

(72) Inventors: Keita Takamura, Yokohama (JP); Masanori Yuri, Yokohama (JP); Shinya Hashimoto, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 724 days.

(21) Appl. No.: 15/502,311

(22) PCT Filed: Jul. 28, 2015

(86) PCT No.: PCT/JP2015/071418
§ 371 (c)(1),
(2) Date: Feb. 7, 2017

(87) PCT Pub. No.: WO2016/031475
PCT Pub. Date: Mar. 3, 2016

(65) Prior Publication Data
US 2017/0234135 A1 Aug. 17, 2017

(30) Foreign Application Priority Data
Aug. 29, 2014 (JP) .............................. JP2014-175185

(51) Int. Cl.
*F01D 5/08* (2006.01)
*F02C 7/18* (2006.01)
(Continued)

(52) U.S. Cl.
CPC .............. *F01D 5/084* (2013.01); *F01D 5/08* (2013.01); *F01D 5/085* (2013.01); *F01D 9/065* (2013.01);
(Continued)

(58) Field of Classification Search
CPC . F01D 5/18; F01D 5/084; F01D 5/085; F01D 9/065; F01D 5/08; F02C 6/08; F02C 7/185; F02C 7/18; F05D 2260/213
(Continued)

(56) References Cited

U.S. PATENT DOCUMENTS 3,034,298 A * 5/1962 White ..................... F01D 11/10
60/726
3,043,561 A * 7/1962 Scheper, Jr. ............ F01D 5/085
415/115

(Continued)

FOREIGN PATENT DOCUMENTS

JP        11-81904       3/1999
JP        2001-123851    5/2001
(Continued)

OTHER PUBLICATIONS

International Search Report dated Oct. 27, 2015 in corresponding International Application No. PCT/JP2015/071418, with English translation.

(Continued)

*Primary Examiner* — Ted Kim
(74) *Attorney, Agent, or Firm* — Wenderoth, Lind & Ponack, L.L.P.

(57) ABSTRACT

An axial-direction passage, a forced vortex passage, a first blade array passage, and a second blade array passage are formed in a rotor shaft of a turbine. Cooling air from an air extraction port of a compressor flows through the axial-direction passage which extends in an axial direction. The forced vortex passage is connected to the axial-direction passage and extends outwards in the radial direction relative to an axial line from a connecting portion between the forced vortex passage and the axial-direction passage. The first blade array passage is connected to an end portion on the outer side in the radial direction of the forced vortex passage (Continued)

and guides cooling air to a first blade row among a plurality of blade rows. The second blade array passage is connected to an end portion of the forced vortex passage and guides cooling air to a second blade row.

7 Claims, 11 Drawing Sheets

(51) Int. Cl.
*F02C 6/08* (2006.01)
*F01D 9/06* (2006.01)
*F01D 5/18* (2006.01)

(52) U.S. Cl.
CPC .................. *F02C 6/08* (2013.01); *F02C 7/18* (2013.01); *F02C 7/185* (2013.01); *F01D 5/18* (2013.01); *F05D 2260/213* (2013.01)

(58) Field of Classification Search
USPC .......................................................... 60/806
See application file for complete search history.

(56) References Cited

U.S. PATENT DOCUMENTS

| | | | | |
|---|---|---|---|---|
| 3,452,542 A * | 7/1969 | Saferstein | ................ | F02C 7/18 60/806 |
| 4,462,204 A * | 7/1984 | Hull | .......................... | F02C 7/18 60/806 |
| 4,982,564 A * | 1/1991 | Hines | ........................ | F02C 7/16 60/39.55 |
| 5,144,794 A * | 9/1992 | Kirikami | ................ | F01D 5/081 60/806 |
| 5,593,274 A * | 1/1997 | Carreno | .................. | F01D 5/081 285/300 |
| 6,007,299 A * | 12/1999 | Uematsu | ................. | F01D 5/084 415/114 |
| 6,065,282 A | 5/2000 | Fukue et al. | | |
| 6,155,040 A * | 12/2000 | Sasaki | ....................... | F01D 5/00 60/806 |
| 6,185,924 B1 * | 2/2001 | Matsumoto | ............. | F01D 5/082 415/110 |
| 6,224,327 B1 * | 5/2001 | Aoki | ....................... | F01D 5/085 415/114 |
| 7,017,349 B2 * | 3/2006 | Laurello | ................. | F01D 5/081 60/782 |
| 8,079,802 B2 * | 12/2011 | Takamura | ............... | F01D 5/085 415/1 |
| 8,668,437 B1 | 3/2014 | Liang | | |
| 2002/0108379 A1 * | 8/2002 | Akiyama | ................ | F01D 5/085 60/806 |
| 2004/0163394 A1 | 8/2004 | Marushima et al. | | |
| 2009/0285680 A1 * | 11/2009 | Hess | ....................... | F01D 5/081 416/1 |
| 2009/0324386 A1 | 12/2009 | Takamura et al. | | |

FOREIGN PATENT DOCUMENTS

| | | |
|---|---|---|
| JP | 2009-243312 | 10/2009 |
| JP | 2009-275705 | 11/2009 |
| WO | 2010/001655 | 1/2010 |

OTHER PUBLICATIONS

Written Opinion of the International Searching Authority dated Oct. 27, 2015 in corresponding International Application No. PCT/JP2015/071418, with English translation.

\* cited by examiner

GAS TURBINE

TECHNICAL FIELD

The present invention relates to a gas turbine.

This application claims priority based on Japanese Patent Application No. 2014-175185 filed in Japan on Aug. 29, 2014, of which the contents are incorporated herein by reference.

BACKGROUND ART

A gas turbine includes a compressor that compresses atmospheric air to generate compressed air, a combustor that combusts fuel in this compressed air to generate combustion gas, and a turbine that is driven by the combustion gas. The turbine includes a turbine rotor that rotates around an axial line, and a turbine casing that covers the turbine rotor. The turbine rotor includes a rotor shaft that extends in an axial direction in which the axial line extends, centered around the axial line, and a plurality of blade rows fixed to this rotor shaft. The plurality of blade rows are arranged in the axial direction. Each of the blade rows includes a plurality of blades arranged in a circumferential direction with the axial line serving as a reference.

The blades of the turbine come into contact with high-temperature combustion gas, and are therefore often cooled by some method. For example, in Patent Document 1 below, air extracted from the compressor is utilized as cooling air for the blades. In the rotor shaft described in Patent Document 1, a rotor bore tube, a first forced vortexing passage, a second forced vortexing passage, a first passage, and a second passage are formed. The rotor bore tube is a cavity, elongated in the axial direction, into which cooling air from the compressor flows. The first forced vortexing passage extends outwards in the radial direction from the rotor bore tube at a position in the axial direction between a first stage blade row and a second stage blade row. The second forced vortexing passage extends outwards in the radial direction from the rotor bore tube at a position in the axial direction between the second stage blade row and a third stage blade row. The first passage guides the cooling air that passed through the first forced vortexing passage to the first stage blade row. The second passage guides the cooling air that passed through the second forced vortexing passage to the second stage blade row.

CITATION LIST

Patent Document

Patent Document 1: Japanese Unexamined Patent Application Publication No. 2009-275705A

SUMMARY OF THE INVENTION

Technical Problems

According to the technology described in Patent Document 1, a passage extending outwards in the radial direction that supplies the cooling air from the compressor is formed for each of the plurality of blade rows. Thus, according to the technology described in Patent Document 1, the rotor shaft is elongated, resulting in problems such as a degradation in vibration characteristics of the turbine rotor and a reduction in aerodynamic performance of the turbine.

Hence, an object of the present invention is to provide a gas turbine capable of cooling a blade using cooling air from a compressor while, at the same time, suppressing a degradation in vibration characteristics of a rotor.

Solution to Problems

A gas turbine according to a first aspect of the present invention for solving the above-described problems includes a compressor that compresses air, a combustor that combusts fuel in the air compressed by the compressor to generate combustion gas, and a turbine that is driven by the combustion gas. The compressor includes an air extraction port that extracts air from an intermediate stage of the compressor as cooling air. The turbine includes a rotor shaft, and a plurality of blade rows that are arranged in an axial direction of the rotor shaft and each include a plurality of blades attached to an outer circumference of the rotor shaft. An axial-direction passage, a forced vortex passage, a first blade array passage, and a second blade array passage are formed in the rotor shaft. The axial-direction passage is connected to the air extraction port and extends in the axial direction. The forced vortex passage is connected to the axial-direction passage and extends from a connecting portion between the forced vortex passage and the axial-direction passage outwards in a radial direction with respect to the rotor shaft. The first blade array passage is connected to an end portion on an outer side in the radial direction of the forced vortex passage and guides the cooling air to a first blade row among a plurality of blade rows. The second blade array passage is connected to an end portion on the outer side in the radial direction of the forced vortex passage and guides the cooling air to a second blade row among the plurality of blade rows.

According to the gas turbine, the number of forced vortex passages that are formed in the rotor shaft and extend in the radial direction can be decreased. Thus, according to the gas turbine, it is possible to suppress elongation of the rotor shaft associated with formation of the forced vortex passages, and thus suppress deterioration of vibration characteristics of the rotor. Further, according to the gas turbine, it is possible to suppress extension of a distance between the plurality of stages associated with formation of the forced vortex passages, and thus suppress a reduction in aerodynamic performance of the turbine.

Further, in a gas turbine according to a second aspect of the present invention for solving the above-described problems, the forced vortex passage may be formed on a downstream side of a third blade row among the plurality of blade rows, the third blade row being disposed on a furthest downstream side of a flow of the combustion gas in the axial direction. In this case, the first blade row and the second blade row are provided on an upstream side of the third blade row furthest downstream among the plurality of blade rows.

According to the gas turbine, it is possible to suppress extension of the distance between all the stages. Further, according to the gas turbine, it is possible to access the end portion on the outer side in the radial direction of the forced vortex passage without disassembling the rotor shaft. Thus, according to the gas turbine, even if a foreign substance such as debris accumulates at the end portion on the outer side in the radial direction of the forced vortex passage, it is possible to easily collect the foreign substance.

Further, the gas turbine according to the first or second aspect may further include an air extraction pipe that connects the air extraction port and the axial-direction passage, an air extraction branch pipe connected to the air extraction pipe, and a pre-swirl nozzle that is connected to the air extraction branch pipe and imparts a speed component in a rotational direction of the rotor shaft to the cooling air that flowed through the air extraction branch pipe. A third blade array passage that guides the cooling air that passed through the pre-swirl nozzle to the third blade row, among the plurality of blade rows, disposed on the furthest downstream side of the flow of the combustion gas in the axial direction may be formed in the rotor shaft.

According to the gas turbine, the cooling air that cools the first blade row and the second blade row is introduced into the forced vortex passage, causing an increase in pressure. Nevertheless, according to the gas turbine, the cooling air that cools the third blade row is passed through the pre-swirl nozzle without being introduced into the forced vortex passage, causing the cooling air to swirl and thus achieving a reduction in a rotation resistance of the turbine rotor. Thus, according to the gas turbine, the air extracted from a single air extraction port is used as cooling air, making it possible to simplify the cooling air system and, at the same time, decrease the rotation resistance of the turbine rotor and increase efficiency of the gas turbine.

Further, in the gas turbine according to the first or second aspect, a second air extraction port may be formed in the compressor, and a second axial-direction passage, a second forced vortex passage, and the third blade array passage may be formed in the rotor shaft. The second air extraction port extracts air from an intermediate stage further on an upstream side of the flow of the air inside the compressor than a first air extraction port, which is the air extraction port, as cooling air. The second axial-direction passage is a passage into which the cooling air from the second air extraction port flows, and extends in the axial direction on the outer side in the radial direction with respect to a first axial-direction passage, which is the axial-direction passage. The second forced vortex passage is connected to the second axial-direction passage, and extends outwards in the radial direction from the connecting portion between the second forced vortex passage and the second axial-direction passage on the downstream side of the third blade row, among the plurality of blade rows, disposed on the furthest downstream side of the flow of the combustion gas in the axial direction. The third blade array passage is connected to an end portion on the outer side in the radial direction of the second forced vortex passage, and guides the cooling air to the third blade row.

Thus, cooling air having a pressure lower than a pressure of the cooling air supplied to the first blade row and the second blade row can be supplied to the third blade row disposed furthest downstream among a plurality of blade rows. Moreover, according to the gas turbine, the air extracted from the compressor is introduced into the rotating rotor shaft, and a forced vortex of the cooling air is produced in this rotor shaft, thereby increasing the pressure of the cooling air. This air is then supplied to the third blade row. As a result, according to the gas turbine, it is possible to extract air having a pressure lower than that of the air from the first air extraction port from the second air extraction port as cooling air, and utilize this air as the cooling air for the third blade row. Thus, according to the gas turbine, a compression ratio of the cooling air for the third blade row can be decreased by the compressor, making it possible to suppress a driving force of the compressor and increase the efficiency of the gas turbine.

Advantageous Effects of Invention

According to one aspect of the present invention, it is possible to cool a blade using cooling air from a compressor and, at the same time, suppress elongation of a rotor shaft and thus suppress a degradation in vibration characteristics of a rotor.

DESCRIPTION OF EMBODIMENTS

The following describes in detail various embodiments of a gas turbine according to the present invention, with reference to the drawings.

First Embodiment

The following describes a first embodiment of the gas turbine according to the present invention with reference to FIGS. 1 to 4.

Figure 1:
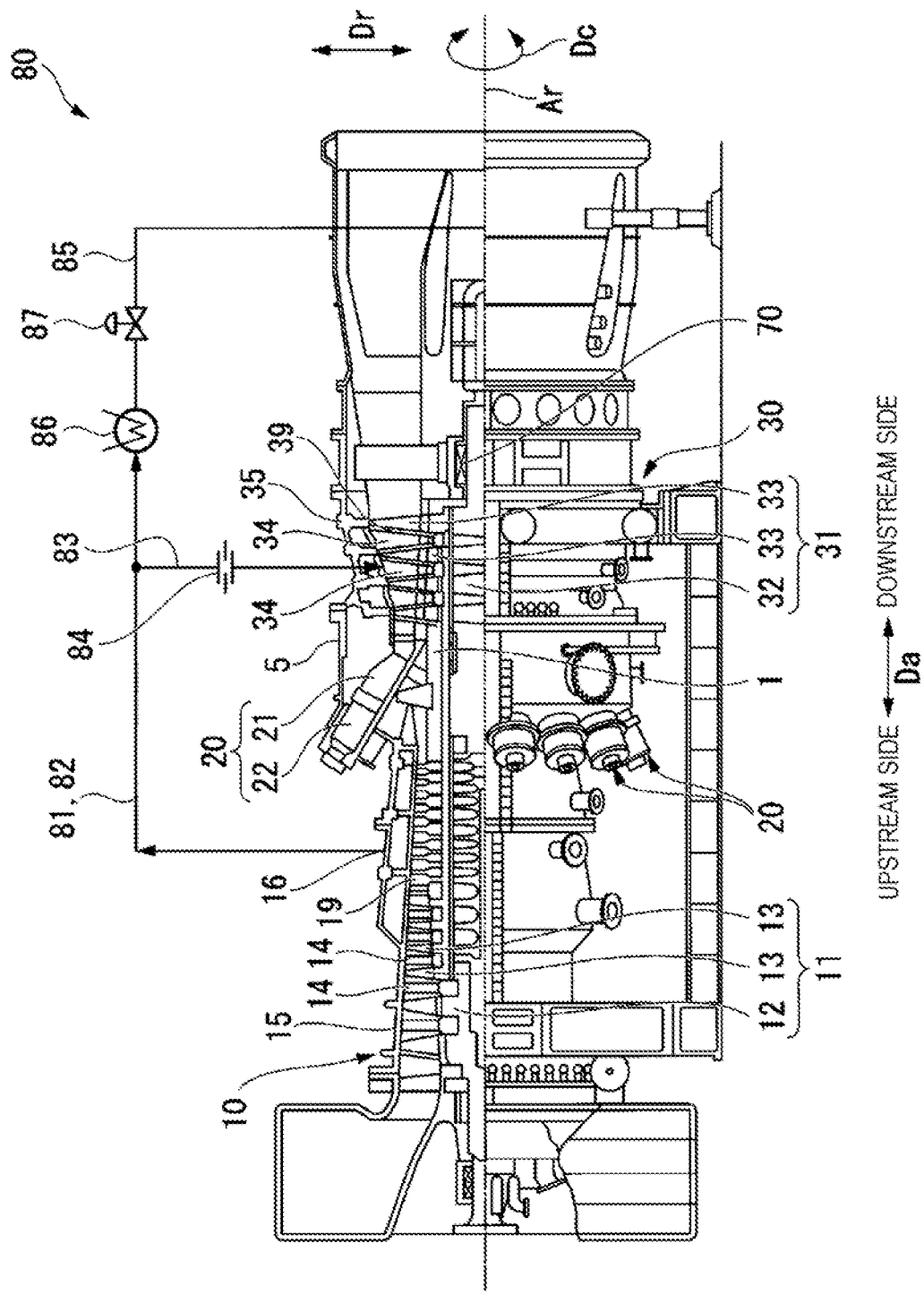
FIG. 1 is an overall cutaway side view of a main portion of a gas turbine of a first embodiment according to the present invention.

A gas turbine according to the present embodiment includes a compressor 10 that compresses air, a combustor 20 that combusts a fuel in the air compressed by the compressor 10 to generate combustion gas, a turbine 30 that is driven by the combustion gas, and an air extraction line 80 that feeds the air extracted from the compressor 10 to the turbine 30 as cooling air, as illustrated in FIG. 1.

Figure 2:
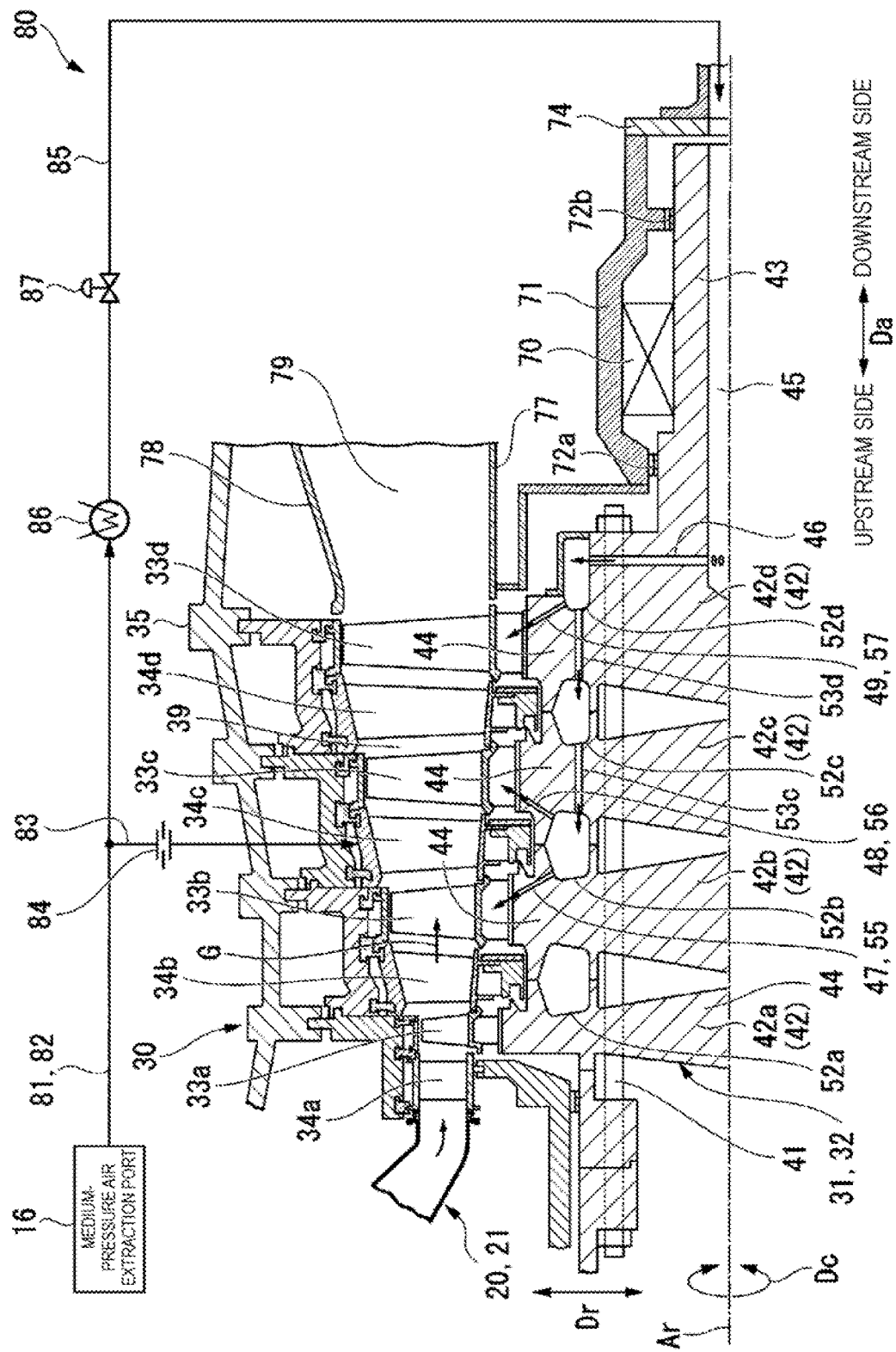
FIG. 2 is a cross-sectional view of the main portion of the gas turbine of the first embodiment according to the present invention.

The compressor 10 includes a compressor rotor 11 that rotates around an axial line Ar, a compressor casing 15 that covers the compressor rotor 11, and a plurality of vane rows 14, as illustrated in FIGS. 1 and 2. Note that, in the following, the direction in which the axial line Ar extends is referred to as an axial direction Da, and one side and the other side of this axial direction Da are referred to as an upstream side and a downstream side, respectively. This upstream side is an upstream side of a flow of the air inside the compressor 10 as well as an upstream side of a flow of the combustion gas inside the turbine 30. Thus, this downstream side is a downstream side of the flow of the air inside the compressor 10 as well as a downstream side of the flow of the combustion gas inside the turbine 30. Further, a circumferential direction around this axial line Ar is simply referred to as a circumferential direction Dc, and a direction orthogonal to the axial line Ar is referred to as a radial direction Dr. The compressor rotor 11 includes a rotor shaft 12 that is centered around the axial line Ar and extends in the axial direction Da, and a plurality of blade rows 13 attached to this rotor shaft 12. The plurality of blade rows 13 are arranged in the axial direction Da. Each of the blade rows 13 includes a plurality of blades arranged in the circumferential direction Dc. The vane rows 14 are respectively disposed on the downstream side of the plurality of blade rows 13. Each of the vane rows 14 is provided on an inner side of the compressor casing 15. Each of the vane rows 14 includes a plurality of vanes arranged in the circumferential direction Dc. An annular space between an outer peripheral side in the radial direction of the rotor shaft 12 and an inner peripheral side in the radial direction of the compressor casing 15 in a region where the vane rows 14 and the blade rows 13 are disposed in the axial direction Da forms an air compression flow channel 19 through which air flows and, at the same time, is compressed. That is, this compressor 10 is an axial flow multistage compressor. In the compressor casing 15, a medium-pressure air extraction port 16 is formed in a position corresponding to an intermediate stage.

The turbine 30 includes a turbine rotor 31 that rotates around the axial line Ar, a turbine casing 35 that covers the turbine rotor 31, and a plurality of vane rows 34. The combustor 20 is fixed to a section on the upstream side of this turbine casing 35. The turbine rotor 31 includes a rotor shaft 32 that is centered around the axial line Ar and extends in the axial direction Da, and a plurality of blade rows 33 attached to this rotor shaft 32. The plurality of blade rows 33 are arranged in the axial direction Da. Each of the blade rows 33 includes a plurality of blades arranged in the circumferential direction Dc. The vane rows 34 are respectively disposed on the upstream side of the plurality of blade rows 33. Each of the vane rows 34 is provided on an inner side of the turbine casing 35. Each of the vane rows 34 includes a plurality of vanes arranged in the circumferential direction Dc. A combustion gas flow channel 39 through which combustion gas G from the combustor 20 flows is formed in an annular space between an outer peripheral side of the rotor shaft 32 and an inner peripheral side of the turbine casing 35 in a region where the vane rows 34 and the blade rows 33 are disposed in the axial direction Da.

The turbine 30 of the present embodiment has four stages. Thus, the turbine 30 of the present embodiment includes a first stage vane row 34a, a second stage vane row 34b, a third stage vane row 34c, and a fourth stage vane row 34d as the vane rows 34. Further, the turbine 30 of the present embodiment includes a first stage blade row 33a, a second stage blade row 33b, a third stage blade row 33c, and a fourth stage blade row 33d as the blade rows 33.

The combustor 20 is fixed to a section on the upstream side of the turbine casing 35. This combustor 20 includes a combustion liner (or transition piece) 21 that feeds the high-temperature, high-pressure combustion gas G into the combustion gas flow channel 39 of the turbine 30, and a fuel injector 22 that injects fuel along with air compressed by the compressor 10 into this combustion liner 21.

The compressor rotor 11 and the turbine rotor 31 are positioned on the same axial line Ar and connected with each other to form a gas turbine rotor 1. Further, the compressor casing 15 and the turbine casing 35 are connected with each other to form a gas turbine casing 5.

The air extraction line 80 includes a medium-pressure air extraction pipe 81, a cooler 86 provided to this medium-pressure air extraction pipe 81, an air adjustment valve 87 provided to the medium-pressure air extraction pipe 81, and an air regulator 84 provided to the medium-pressure air extraction pipe 81. The medium-pressure air extraction pipe 81 includes a medium-pressure air extraction main pipe 82 connected to the medium-pressure air extraction port 16 of the compressor 10, and a vane medium-pressure air extraction pipe 83 as well as a blade medium-pressure air extraction pipe 85 connected to the medium-pressure air extraction main pipe 82.

The vane medium-pressure air extraction pipe 83 is connected to a position corresponding to the intermediate stage of the turbine 30 on the turbine casing 35. The air regulator 84, such as an orifice, for regulating a pressure and a flow rate of the air that passes through this vane medium-pressure air extraction pipe 83 is provided to the vane medium-pressure air extraction pipe 83. Note that this air regulator 84 may be an adjustment valve. The blade medium-pressure air extraction pipe 85 is connected to the rotor shaft 32. The cooler 86 and the air adjustment valve 87 described above are provided to this blade medium-pressure air extraction pipe 85. The cooler 86 cools the air that passes through this blade medium-pressure air extraction pipe 85. The air adjustment valve 87 adjusts the flow rate of the air that passes through this blade medium-pressure air extraction pipe 85. Note that the cooler 86 may be provided to the medium-pressure air extraction main pipe 82.

The rotor shaft 32 of the turbine rotor 31 includes a plurality of rotor discs 42, as illustrated in FIG. 2. The plurality of rotor discs 42 are arranged in the axial direction Da and connected to each other by a spindle bolt 41 that is inserted through the rotor disks 42 in the axial direction Da. The turbine 30 of the present embodiment includes a first disc 42a, a second disc 42b, a third disc 42c, and a fourth disc 42d as the rotor discs 42. One blade row 33 is attached to each of the plurality of rotor discs 42. That is, the first stage blade row 33a is attached to the first disc 42a, the second stage blade row 33b is attached to the second disc 42b, the third stage blade row 33c is attached to the third disc 42c, and the fourth stage blade row 33d is attached to the fourth disc 42d.

The rotor shaft 32 includes a small diameter portion 43 supported by a bearing 70, and a large diameter portion 44 that has a larger outer diameter than an outer diameter of the small diameter portion 43. The plurality of blade rows 33 are attached to an outer circumference of this large diameter portion 44. The small diameter portion 43 is provided on the downstream side of the large diameter portion 44. An outer peripheral side of the bearing 70 is covered by a bearing cover 71. An upstream side seal member 72a that seals an area between the bearing cover 71 and the small diameter portion 43 of the rotor shaft 32 is provided on the upstream side of the bearing 70, and a downstream side seal member 72b that seals an area between the bearing cover 71 and the small diameter portion 43 of the rotor shaft 32 is provided on the downstream side of the bearing 70, on an inner peripheral side of the bearing cover 71.

An inner diffuser 77 having a cylindrical shape and centered around the axial line Ar is disposed on the outer peripheral side of the small diameter portion 43, and an outer diffuser 78 having a cylindrical shape and centered around the axial line Ar is disposed on an outer peripheral side of this inner diffuser 77, on the downstream side of the large diameter portion 44 of the rotor shaft 32. The inner diffuser 77 and the outer diffuser 78 are both directly or indirectly fixed to the turbine casing 35. An annular space between the outer peripheral side of the inner diffuser 77 and the inner peripheral side of the outer diffuser 78 forms a combustion gas exhaust flow path 79 through which the combustion gas flowing out from the combustion gas flow channel 39 flows.

An axial-direction passage 45, a forced vortex passage 46, a second stage blade array passage 47 (first blade array passage), a third stage blade array passage 48 (second blade array passage), and a fourth stage blade array passage 49 (third blade array passage) are formed in the rotor shaft 32. The axial-direction passage 45 is a passage into which cooling air from the medium-pressure air extraction port 16 flows, and extends in the axial direction Da. The forced vortex passage 46 is connected to the axial-direction passage 45 and extends outwards in the radial direction. The second stage blade array passage 47 guides the cooling air that passed through the forced vortex passage 46 to the second stage blade row 33b (first blade row). The third stage blade array passage 48 guides the cooling air that passed through the forced vortex passage 46 to the third stage blade row 33c (second blade row). The fourth stage blade array passage 49 guides the cooling air that passed through the forced vortex passage 46 to the fourth stage blade row 33d (third blade row). The axial-direction passage 45 opens on a downstream end of the small diameter portion 43, and extends in the axial direction Da to a position on a downstream portion of the large diameter portion 44. This axial-direction passage 45 is a circular column-shaped passage centered around the axial line Ar. The second stage blade array passage 47, the third stage blade array passage 48, the fourth stage blade array passage 49, and the forced vortex passage 46 are each formed in the large diameter portion 44 of the rotor shaft 32. The forced vortex passage 46 is formed in a position on the downstream side of the fourth stage blade row 33d furthest downstream in the large diameter portion 44. The second stage blade array passage 47, the third stage blade array passage 48, and the fourth stage blade array passage 49 are each connected to an end portion on the outer side in the radial direction of the forced vortex passage 46.

Note that, in the specification and claims of the present application, "A and B are connected" refers to a state in which A and B are configured so that air flows from A to B or from B to A.

Figure 4A:
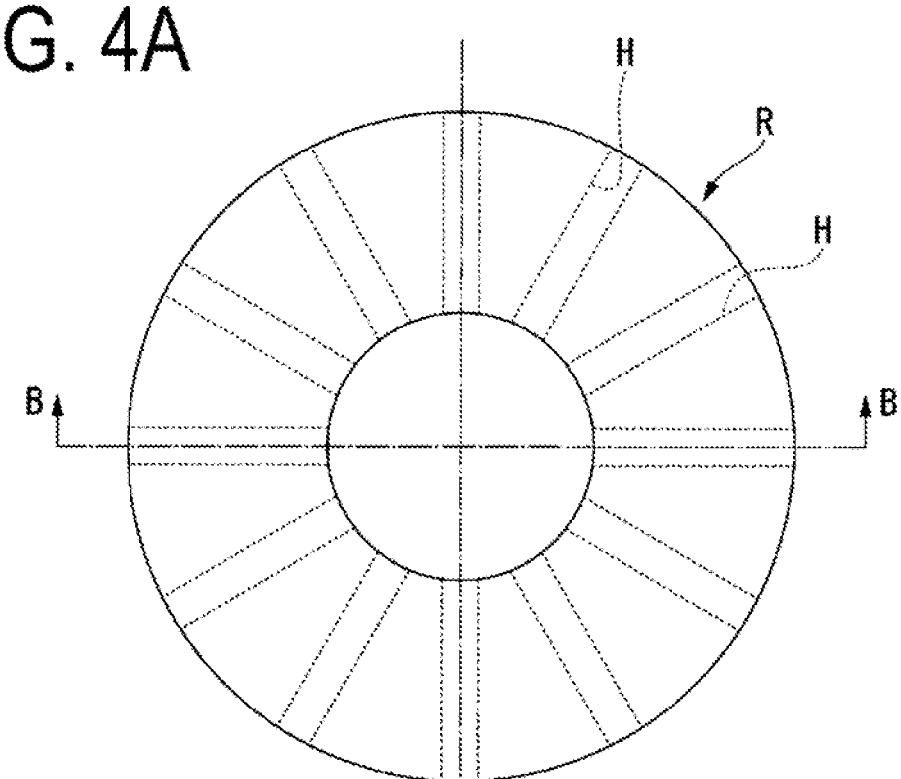
FIGS. 4A and 4B illustrate a rotating body in which a forced vortex passage is formed, FIG. 4A being a front view of the rotating body and FIG. 4B being a cross-sectional view thereof taken along the line B-B of FIG. 4A.
Figure 4B:
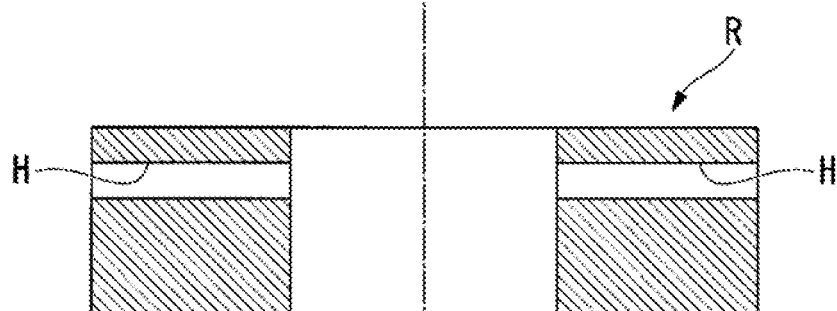

Further, in the specification and claims of the present application, "forced vortex passage" refers to a flow channel that serves as a passage of a fluid provided to a rotating body and feeds the fluid outwards or inwards in the radial direction while swirling the fluid at the same peripheral speed as that of the rotating body. Such a flow channel is generally a hole H that is linearly provided in a radial direction of a rotating body R, such as a rotor disc, and interconnects different positions in the radial direction, such as illustrated in FIGS. 4A and 4B. However, the forced vortex passage is not limited thereto, and may be a hole having a curved shape, and may be formed using a cylindrical member that is attached to a disc and extends in the radial direction or a blade member that protrudes from a disc in the axial direction as in a radial compressor.

The passages in the large diameter portion 44 of the rotor shaft 32 will now be described in more detail.

A first cavity 52a is formed between the first disc 42a and the second disc 42b. A second cavity 52b is formed between the second disc 42b and the third disc 42c. A third cavity 52c is formed between the third disc 42c and the fourth disc 42d. A fourth cavity 52d is formed in a section on the downstream side in the fourth disc 42d. The first cavity 52a, the second cavity 52b, the third cavity 52c, and the fourth cavity 52d are each an annular space with the axial line Ar serving as the center. The fourth cavity 52d is formed in a position where the forced vortex passage 46 is formed in the axial direction Da, and is connected to the end portion on the outer side in the radial direction of this forced vortex passage 46. A fourth disc passage 53d and a fourth stage communicating passage 57 are formed in the fourth disc 42d. The fourth disc passage 53d extends in the axial direction Da and communicates with the fourth cavity 52d and the third cavity 52c. The fourth stage communicating passage 57 communicates with the fourth cavity 52d and an attachment position of the fourth stage blade row 33d. A third disc passage 53c and a third stage communicating passage 56 are formed in the third disc 42c. The third disc passage 53c extends in the axial direction Da and communicates with the second cavity 52b and the third cavity 52c. The third stage communicating passage 56 communicates with the second cavity 52b and an attachment position of the third stage blade row 33c. A second stage communicating passage 55 that communicates with the second cavity 52b and an attachment position of the second stage blade row 33b is formed in the second disc 42b.

The fourth stage blade array passage 49 is formed by the fourth cavity 52d and the fourth stage communicating passage 57. The third stage blade array passage 48 is formed by the fourth cavity 52d, the fourth disc passage 53d, the third cavity 52c, the third disc passage 53c, the second cavity 52b, and the third stage communicating passage 56. The second stage blade array passage 47 is formed by the fourth cavity 52d, the fourth disc passage 53d, the third cavity 52c, the third disc passage 53c, the second cavity 52b, and the second stage communicating passage 55.

Thus, the fourth cavity 52d forms a passage common to the fourth stage blade array passage 49, the third stage blade array passage 48, and the second stage blade array passage 47. Further, the fourth disc passage 53d, the third cavity 52c, the third disc passage 53c, and the second cavity 52b form a passage common to the third stage blade array passage 48 and the second stage blade array passage 47.

An axial end flange 74 opposing the rotor shaft 32 at a distance in the axial direction Da is disposed on a downstream end of the rotor shaft 32. This axial end flange 74 is fixed to the bearing cover 71. An end portion of the blade medium-pressure air extraction pipe 85 is fixed to this axial end flange 74. A through-hole for communicating an interior of the blade medium-pressure air extraction pipe 85 and the axial-direction passage 45 formed in the rotor shaft 32 is formed in this axial end flange 74.

Next, the operation of the gas turbine described above will be described.

The compressor 10 generates compressed air by sucking in and compressing ambient air. The compressed air generated by the compressor 10 is partially discharged into the combustion liner 21 via the fuel injector 22 of the combustor 20. Further, fuel from the fuel injector 22 is injected into the combustion liner 21. This fuel combusts in the compressed air inside the combustion liner 21. As a result of this combustion, the combustion gas G is generated, and this combustion gas G flows from the combustion liner 21 into the combustion gas flow channel 39 of the turbine 30. This combustion gas G passes through the combustion gas flow channel 39, thereby rotating the turbine rotor 31.

The blades of the turbine 30 disposed inside the combustion gas flow channel 39 are exposed to the high-temperature combustion gas. Thus, in the present embodiment, the air extracted from the compressor 10 is supplied as cooling air to the blades that constitute the second stage blade row 33b, the third stage blade row 33c, and the fourth stage blade row 33d, and cools the blades. Furthermore, in the present embodiment, the cooling air is also supplied to the vanes that constitute the third stage vane row 34c, and cools the vanes.

Figure 3:
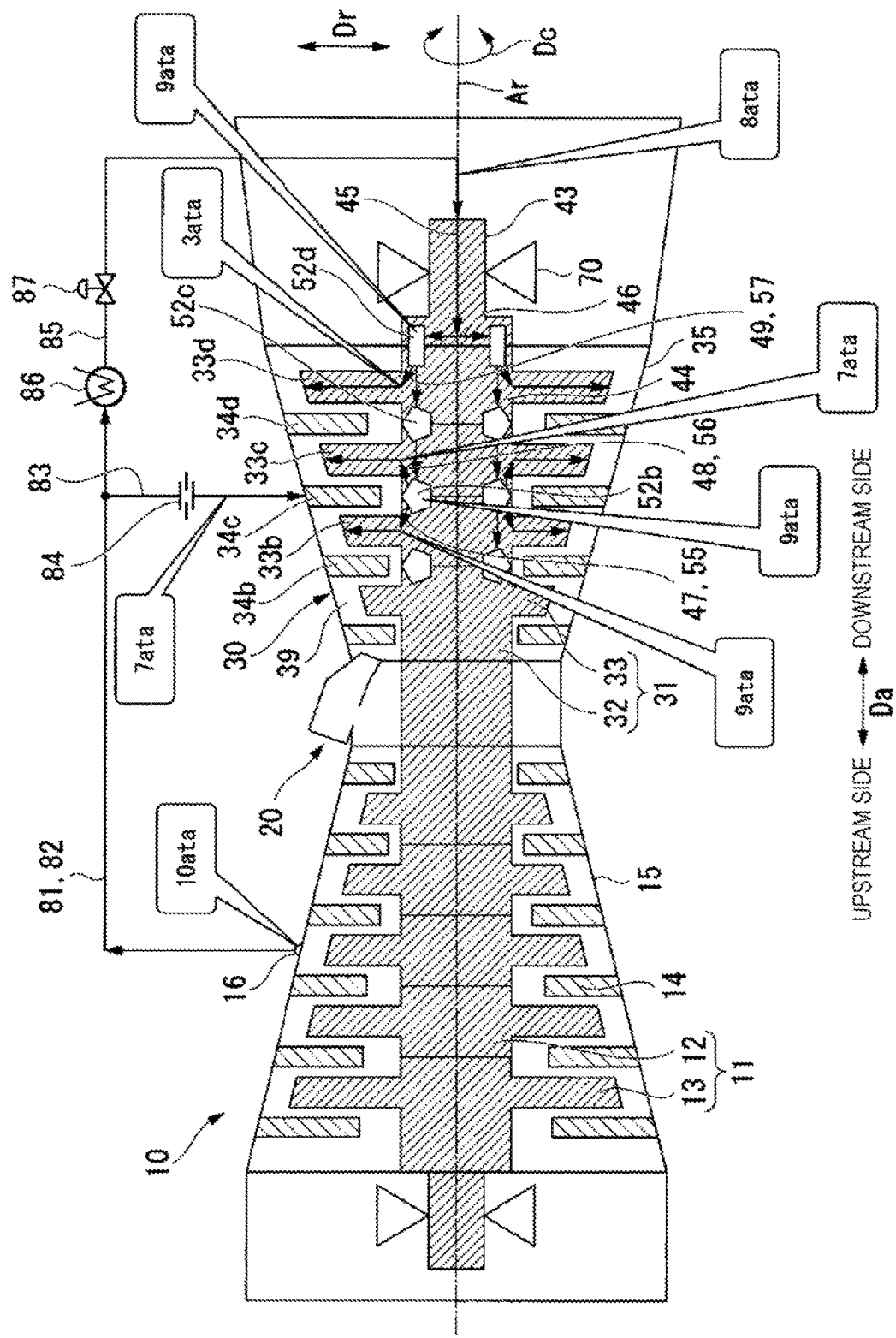
FIG. 3 is an explanatory view illustrating a flow of cooling air and a state quantity thereof in the first embodiment according to the present invention.

FIG. 3 illustrates an exemplary temperature and pressure balance in the gas turbine. The pressure of the air in the medium-pressure air extraction port 16 of the compressor 10 is 10 ata. Further, the pressure between the second stage vane row 34b and the second stage blade row 33b in the combustion gas flow channel 39 is 8 ata, the pressure between the third stage vane row 34c and the third stage blade row 33c in the combustion gas flow channel 39 is 6 ata, and the pressure between the fourth stage vane row 34d and the fourth stage blade row 33d in the combustion gas flow channel 39 is 2 ata.

The cooling air extracted from the medium-pressure air extraction port 16 of the compressor 10 flows through the medium-pressure air extraction main pipe 82 of the air extraction line 80. A portion of the cooling air then flows into the vane medium-pressure air extraction pipe 83 while a remaining portion flows into the blade medium-pressure air extraction pipe 85. The cooling air introduced into the vane medium-pressure air extraction pipe 83 reaches a pressure of 7 ata in a process of passing through the air regulator 84, is supplied to the plurality of vanes that constitute the third stage vane row 34c, and cools the plurality of vanes.

The cooling air introduced into the blade medium-pressure air extraction pipe 85 is cooled in a process of passing through the cooler 86, adjusted in flow rate by the air adjustment valve 87, and then introduced into the axial-direction passage 45 of the rotor shaft 32. Owing to the pressure loss in the process of passing through the cooler 86 and the air adjustment valve 87 and the like, the cooling air immediately prior to introduction into the axial-direction passage 45 reduces in pressure to about 8 ata. Further, the cooling air immediately prior to introduction into the axial-direction passage 45 is cooled by the cooler 86, reducing in temperature.

The cooling air introduced into the axial-direction passage 45 flows through the forced vortex passage 46 that extends outwards in the radial direction from this axial-direction passage 45, and into the fourth cavity 52d. In the process of passing through the forced vortex passage 46 that extends outwards in the radial direction, the cooling air is subjected to a centrifugal force from the rotor shaft 32 that rotates around the axial line Ar, increasing in pressure. As a result, the pressure of the cooling air that reached the fourth cavity 52d is 9 ata. Note that the cooling air in the fourth cavity 52d rises in temperature due to increased pressure.

A portion of the cooling air in the fourth cavity 52d flows through the fourth stage communicating passage 57 that partially forms the fourth stage blade array passage 49, and into the cooling air passages in the plurality of blades that constitute the fourth stage blade row 33d. In the process of passing through the fourth stage communicating passage 57, this cooling air is regulated in pressure and flow rate. As a result, the cooling air immediately prior to flowing from the fourth stage communicating passage 57 into the blades of the fourth stage blade row 33d reaches a pressure of 3 ata. This cooling air passes through the cooling air passages in the plurality of blades that constitute the fourth stage blade row 33d, cools the blades, and then is discharged into the combustion gas flow channel 39.

The remaining portion of the cooling air in the fourth cavity 52d flows through the fourth disc passage 53d, the third cavity 52c, and the third disc passage 53c, and into the second cavity 52b. The pressure of the cooling air in the second cavity 52b is approximately the same as the pressure of the cooling air in the fourth cavity 52d at 9 ata.

A portion of the cooling air introduced into the second cavity 52b flows through the third stage communicating passage 56 that partially forms the third stage blade array passage 48, and into the cooling air passages in the plurality of blades that constitute the third stage blade row 33c. In the process of passing through the third stage communicating passage 56, this cooling air is regulated in pressure and flow rate, and reaches a pressure of approximately 7 ata immediately prior to flowing from the third stage communicating passage 56 into the blades of the third stage blade row 33c. This cooling air passes through the cooling air passages in the plurality of blades that constitute the third stage blade row 33c, cools the blades, and then is discharged into the combustion gas flow channel 39.

The remaining portion of the cooling air introduced into the second cavity 52b flows through the second stage communicating passage 55 that partially forms the second stage blade array passage 47, and into the cooling air passages in the plurality of blades that constitute the second stage blade row 33b. In the process of passing through the second stage communicating passage 55, this cooling air is regulated in pressure and flow rate. As a result, the cooling air immediately prior to flowing from the second stage communicating passage 55 into the blades of the second stage blade row 33b reaches a pressure of approximately 9 ata. This cooling air passes through the cooling air passages in the plurality of blades that constitute the second stage blade row 33b, cools the blades, and then is discharged into the combustion gas flow channel 39.

The cooling air that flows from the fourth cavity 52d through the fourth stage communicating passage 57 and into the blades of the fourth stage blade row 33d, the cooling air that flows from the second cavity 52b through the third stage communicating passage 56 and into the blades of the third stage blade row 33c, and the cooling air that flows from the second cavity 52b through the second stage communicating passage 55 and into the blades of the second stage blade row 33b each incur a pressure loss in the process of passing through the communicating passages 57, 56, 55, and increase in pressure upon being subjected to the centrifugal force from the rotor shaft 32. The cooling air that flows from the fourth cavity 52d through the fourth stage communicating passage 57 and into the blades of the fourth stage blade row 33d incurs a greater pressure loss when passing through the communicating passage 57 than the pressure effect from the centrifugal force in the process of passing through the fourth stage communicating passage 57 and, as a result, is reduced in pressure. Further, the cooling air that flows from the second cavity 52b through the third stage communicating passage 56 and into the blades of the third stage blade row 33c also incurs a greater pressure loss when passing through the communicating passage 56 than the pressure effect from the centrifugal force and, as a result, is reduced in pressure. On the other hand, the cooling air that flows from the second cavity 52b through the second stage communicating passage 55 and into the blades of the second stage blade row 33b is suppressed from incurring a pressure loss in the process of passing through the second stage communicating passage 55.

As described above, in the present embodiment, it is possible to cool the blades of the turbine 30 by the air extracted from the compressor 10. Moreover, in the present embodiment, the air extracted from the compressor 10 is introduced into the rotating rotor shaft 32 and a forced vortex of the cooling air is produced in this rotor shaft 32, thereby increasing the pressure of the cooling air. This cooling air is then supplied to each of the blade rows 33. As a result, in the present embodiment, it is possible to extract low-pressure air from the compressor 10, making it possible to suppress the driving force of the compressor 10. Thus, in the present embodiment, it is possible to cool the blades of the turbine 30 by the air extracted from the compressor 10 and, at the same time, suppress a reduction in the efficiency of the gas turbine.

Further, in the present embodiment, to suppress the pressure of the air extracted from the compressor 10, the forced vortex passage 46 that extends in the radial direction is formed in the rotor shaft 32, and the air extracted from the compressor 10 is introduced into the forced vortex passage 46, increased in pressure, and then distributed to the blades of each of the blade rows 33. Note that the forced vortex passage 46 may be formed for each of the plurality of blade rows 33. Nevertheless, in this case, the plurality of forced vortex passages 46 are formed inside the rotor shaft 32 in different positions in the axial direction Da and, as a result, the length of the rotor shaft 32 in the axial direction Da increases, degrading the vibration characteristics of the turbine rotor 31. Furthermore, the distance between stages of the turbine 30 also increases, reducing the aerodynamic performance of the turbine 30.

On the other hand, in the present embodiment as described above, once the air is increased in pressure in the forced vortex passage 46, the air is distributed to each of the plurality of blade rows 33, thereby suppressing elongation of the rotor shaft 32 in the axial direction Da and thus making it possible to suppress deterioration of the vibration characteristics of the turbine rotor 31. Furthermore, the forced vortex passage 46 is formed on the downstream side of the fourth stage blade row 33d furthest downstream and does not exist in any location between the plurality of stages, making it possible to suppress elongation of the distance between the stages of the turbine 30 and thus suppress a reduction in the aerodynamic performance of the turbine 30 as well.

Further, a foreign substance such as debris contained in the air that flows through the forced vortex passage 46 is expected to accumulate at the end portion on the outer side in the radial direction of the forced vortex passage 46. In the present embodiment, this forced vortex passage 46 is formed in a position on the downstream side of the fourth stage blade row 33d furthest downstream, making it possible to access the end portion on the outer side in the radial direction of this forced vortex passage 46 without disassembling the rotor shaft 32 into the plurality of rotor discs 42. Thus, in the present embodiment, even if a foreign substance such as debris accumulates at the end portion on the outer side in the radial direction of the forced vortex passage 46, it is possible to easily collect the foreign substance.

Second Embodiment

Figure 5:
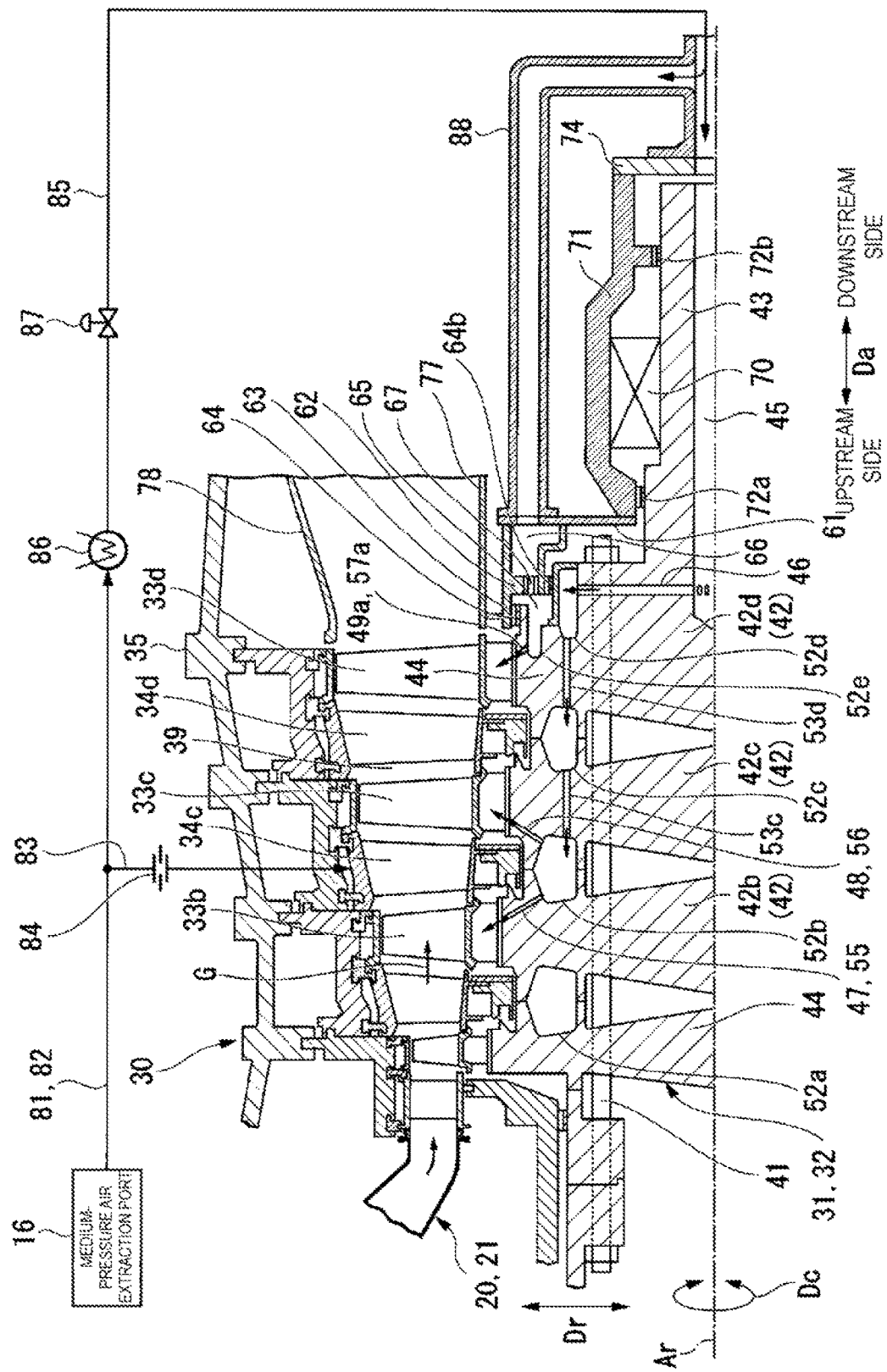
FIG. 5 is a cross-sectional view of a main portion of a gas turbine of a second embodiment according to the present invention.
Figure 6:
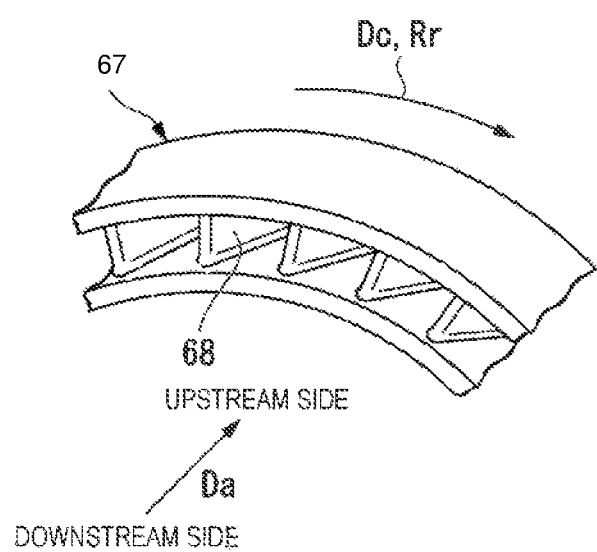
FIG. 6 is a perspective view of a main portion of a pre-swirl nozzle of the second embodiment according to the present invention.
Figure 7:
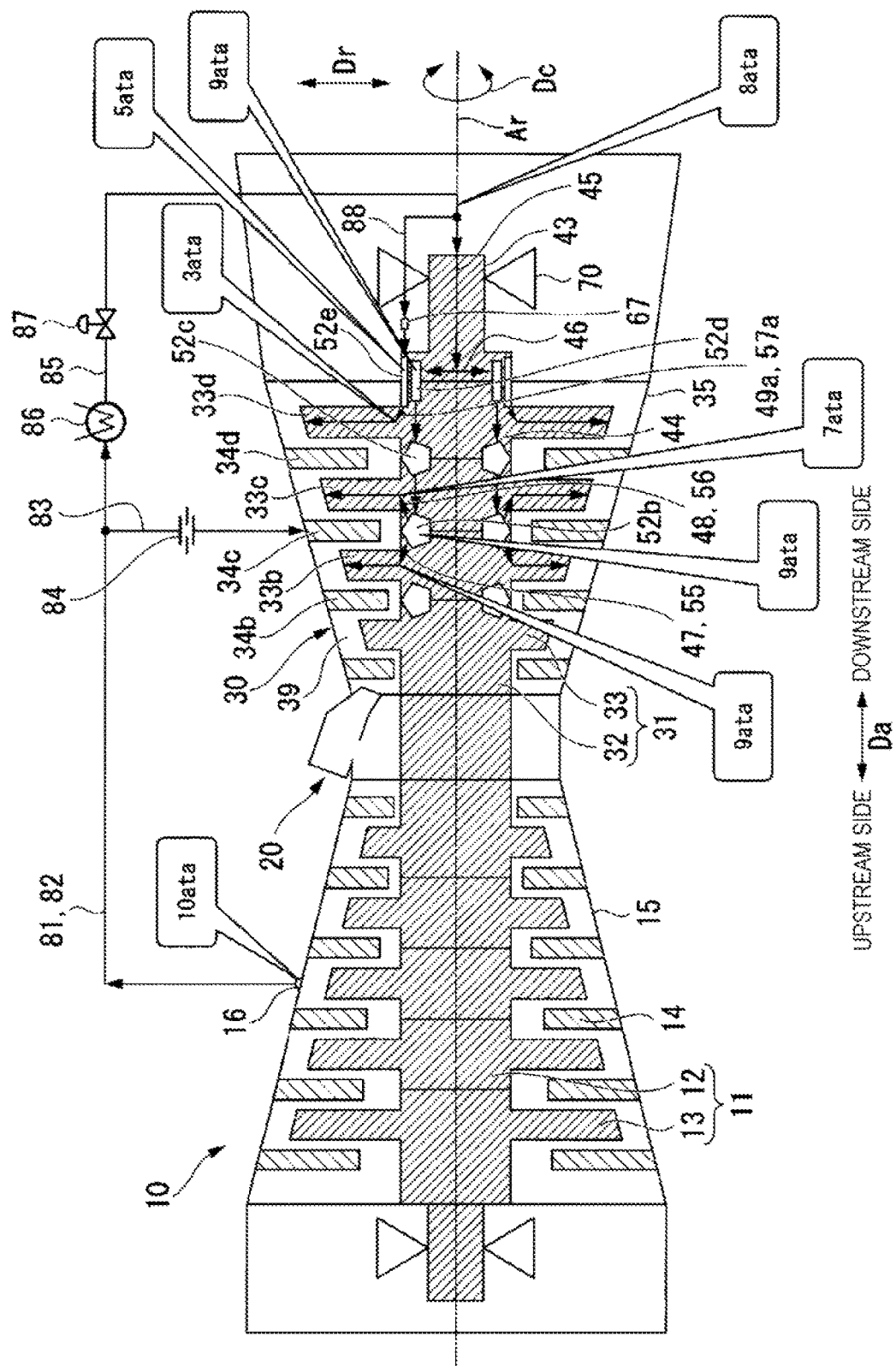
FIG. 7 is an explanatory view illustrating a flow of cooling air and a state quantity thereof in the second embodiment according to the present invention.

The following describes a second embodiment of the gas turbine according to the present invention with reference to FIGS. 5 to 7.

In the gas turbine of the first embodiment, the cooling air extracted from the medium-pressure air extraction port 16 of the compressor 10 is separated into air for the second stage blade row 33b, air for the third stage blade row 33c, and air for the fourth stage blade row 33d in the rotor shaft 32 of the turbine 30.

In the gas turbine of the present embodiment, the cooling air extracted from the medium-pressure air extraction port 16 of the compressor 10 is first separated into air for the second and third stage blade rows 33b, 33c, and air for the fourth stage blade row 33d outside the rotor shaft 32 of the turbine 30, as illustrated in FIGS. 5 and 7. Furthermore, in this gas turbine, the air for the second and third stage blade rows 33b, 33c is separated into air for the second stage blade row 33b and air for the third stage blade row 33c in the rotor shaft 32.

For this purpose, in the present embodiment, an air extraction branch pipe 88 that guides a portion of the cooling air that flowed through the blade medium-pressure air extraction pipe 85 into the fourth stage blade row 33d as air for the fourth stage blade row 33d is connected to the blade medium-pressure air extraction pipe 85 connected to the downstream end of the rotor shaft 32. This air extraction branch pipe 88 is connected to a downstream end of the large diameter portion 44 of the rotor shaft 32.

In the rotor shaft 32 of the present embodiment, similarly to the rotor shaft 32 of the first embodiment, the axial-direction passage 45, the forced vortex passage 46, the second stage blade array passage 47 (first blade array passage), and the third stage blade array passage 48 (second blade array passage) are formed. The axial-direction passage 45 is a passage into which cooling air from the medium-pressure air extraction port 16 flows via the blade medium-pressure air extraction pipe 85. The forced vortex passage 46 is connected to the axial-direction passage 45. The second stage blade array passage 47 guides the cooling air that passed through the forced vortex passage 46 to the second stage blade row 33b (first blade row). The third stage blade array passage 48 guides the cooling air that passed through the forced vortex passage 46 to the third stage blade row 33c (second blade row).

The first cavity 52a, the second cavity 52b, the third cavity 52c, and the fourth cavity 52d are formed in the large diameter portion 44 of the rotor shaft 32, similarly to the large diameter portion 44 of the rotor shaft 32 of the first embodiment. The fourth cavity 52d is connected to the end portion on the outer side in the radial direction of the forced vortex passage 46. The fourth cavity 52d and the third cavity 52c are connected by the fourth disc passage 53d, and the third cavity 52c and the second cavity 52b are connected by the third disc passage 53c. The second cavity 52b and the third stage blade row 33c are connected by the third stage communicating passage 56, and the second cavity 52b and the second stage blade row 33b are connected by the second stage communicating passage 55.

Thus, in the present embodiment as well, the third stage blade array passage 48 is formed by the fourth cavity 52d, the fourth disc passage 53d, the third cavity 52c, the third disc passage 53c, the second cavity 52b, and the third stage communicating passage 56. Further, the second stage blade array passage 47 is formed by the fourth cavity 52d, the fourth disc passage 53d, the third cavity 52c, the third disc passage 53c, the second cavity 52b, and the second stage communicating passage 55.

In the large diameter portion 44 of the rotor shaft 32 of the present embodiment, a fifth cavity 52e indented from the downstream side end of the large diameter portion 44 toward the upstream side is further formed in a position on the outer side in the radial direction with respect to the fourth cavity 52d. This fifth cavity 52e and the fourth stage blade row 33d are connected by a fourth stage communicating passage 57a. Thus, in the present embodiment, a fourth stage blade array passage 49a (third blade array passage) that guides the cooling air that passed through a pre-swirl nozzle 67 into the fourth stage blade row 33d is formed so as to include the fifth cavity 52e and the fourth stage communicating passage 57a.

An axial end plate 61 having a disc shape with the axial line Ar serving as the center is disposed opposing the downstream end of the large diameter portion 44 at a distance in the axial direction Da, on the downstream side of the large diameter portion 44. An end on an inner side in the radial direction of the axial end plate 61 is fixed to an upstream end of the bearing cover 71. A large diameter portion end cover 62 is disposed opposing the downstream end of the large diameter portion 44 at a distance in the axial direction Da, between this axial end plate 61 and the large diameter portion 44. An end on the inner side in the radial direction of this large diameter portion end cover 62 is fixed to the axial end plate 61. Further, an end on the outer side in the radial direction of this large diameter portion end cover 62 is fixed to an upstream end of the inner diffuser 77. A seal attachment portion 63 opposing an outer peripheral surface on the downstream side of the large diameter portion 44 at a distance is formed in a section on the outer side in the radial direction of the large diameter portion end cover 62. This seal attachment portion 63 is provided with a seal member 64 that seals an area between the large diameter portion 44 and the large diameter portion end cover 62.

A large diameter portion end cavity 65 that communicates with the fifth cavity 52e and is an annular space with the axial line Ar as the center is formed between the large diameter portion end cover 62 and the large diameter portion 44. Further, an air receiving space 66 that is an annular space with the axial line Ar as the center is formed in the region where the fifth cavity 52e is formed in the radial direction Dr, between the large diameter portion end cover 62 and the axial end plate 61. This air receiving space 66 is a space surrounded by the large diameter portion end cover 62 and the axial end plate 61.

An end portion of the air extraction branch pipe 88 is fixed to the axial end plate 61. As a result, a portion of the cooling air that flowed through the blade medium-pressure air extraction pipe 85 flows through the air extraction branch pipe 88 and into the air receiving space 66 formed by the axial end plate 61 and the large diameter portion end cover 62. In the large diameter portion end cover 62, the pre-swirl nozzle 67 that imparts a speed component in the rotational direction of the rotor shaft 32 to the cooling air introduced into the air receiving space 66 is provided in a position opposing the fifth cavity 52e of the large diameter portion 44. In the large diameter portion end cover 62, a seal member 64b that seals an area between the large diameter portion 44 and the large diameter portion end cover 62 is provided in a position opposing the large diameter portion 44 in the radial direction, on the inner side in the radial direction with respect to the position where the pre-swirl nozzle 67 is provided.

The pre-swirl nozzle 67 includes a plurality of swirl vanes 68 arranged in the circumferential direction Dc, as illustrated in FIG. 6. The swirl vane 68 gradually inclines to a rotational direction Rr side of the rotor shaft 32, from the downstream side toward the upstream side. This pre-swirl nozzle 67 is a nozzle that partially converts the pressure of the cooling air introduced into the air receiving space 66 on the downstream side to kinetic energy in the rotational direction Rr of the rotor shaft 32, imparting a speed component in the rotational direction Rr to the cooling air.

Next, the flow of the cooling air in the gas turbine described above will be described.

The cooling air extracted from the medium-pressure air extraction port 16 of the compressor 10 and introduced into the blade medium-pressure air extraction pipe 85 is, similarly to the first embodiment, cooled in the process of passing through the cooler 86, adjusted in flow rate by the air adjustment valve 87, and then partially introduced into the axial-direction passage 45 of the rotor shaft 32. The cooling air immediately prior to introduction into the axial-direction passage 45 reduces in pressure to about 8 ata as illustrated in FIG. 7, and reduces in temperature as well.

The cooling air introduced into the axial-direction passage 45, similarly to the first embodiment, flows through the forced vortex passage 46 that extends outwards in the radial direction from this axial-direction passage 45, and into the fourth cavity 52d. In the process of passing through the forced vortex passage 46 that extends outwards in the radial direction, the cooling air is subjected to a centrifugal force from the rotor shaft 32 that rotates around the axial line Ar, increasing in pressure. As a result, the pressure of the cooling air that reached the fourth cavity 52d is 9 ata. Note that the cooling air in the fourth cavity 52d rises in temperature due to increased pressure.

The cooling air in the fourth cavity 52d flows through the fourth disc passage 53d, the third cavity 52c, and the third disc passage 53c, and into the second cavity 52b. The pressure of the cooling air in the second cavity 52b is approximately the same as the pressure of the cooling air in the fourth cavity 52d at 9 ata, and the temperature of this cooling air is approximately the same as the temperature of the cooling air in the fourth cavity 52d.

A portion of the cooling air introduced into the second cavity 52b, similarly to the first embodiment, flows through the third stage communicating passage 56 that partially forms the third stage blade array passage 48, and into the cooling air passages in the plurality of blades that constitute the third stage blade row 33c. In the process of passing through the third stage communicating passage 56, this cooling air is regulated in pressure and flow rate, and reaches a pressure of approximately 7 ata immediately prior to flowing from the third stage communicating passage 56 into the blades of the third stage blade row 33c. This cooling air passes through the cooling air passages in the plurality of blades that constitute the third stage blade row 33c, cools the blades, and then is discharged into the combustion gas flow channel 39.

The remaining portion of the cooling air introduced into the second cavity 52b, similarly to the first embodiment, flows through the second stage communicating passage 55 that partially forms the second stage blade array passage 47, and into the cooling air passages in the plurality of blades that constitute the second stage blade row 33b. In the process of passing through the second stage communicating passage 55, this cooling air is regulated in pressure and flow rate. As a result, the cooling air immediately prior to flowing from the second stage communicating passage 55 into the blades of the second stage blade row 33b reaches a pressure of approximately 9 ata. This cooling air passes through the cooling air passages in the plurality of blades that constitute the second stage blade row 33b, cools the blades, and then is discharged into the combustion gas flow channel 39.

A portion of the cooling air that flows through the blade medium-pressure air extraction pipe 85 flows into the air extraction branch pipe 88. The pressure of the cooling air introduced into the air extraction branch pipe 88 is approximately 8 ata.

The cooling air flows from the air extraction branch pipe 88 into the air receiving space 66, then through the pre-swirl nozzle 67 and into the large diameter portion end cavity 65. In the process of the cooling air flowing through the pre-swirl nozzle 67, the pressure of the cooling air is partially converted to kinetic energy in the rotational direction Rr of the rotor shaft 32, imparting a speed component in the rotational direction Rr to the cooling air. The cooling air upon passing through the pre-swirl nozzle 67 reduces in pressure to about 5 ata. Further, a circumferential velocity, with reference to the axial line Ar, of the cooling air upon passing through the pre-swirl nozzle 67 is approximately the same as a circumferential velocity in a position of the fifth cavity 52e in the rotor shaft 32. That is, the cooling air in the large diameter portion end cavity 65 swirls in the large diameter portion end cavity 65 having an annular shape at a circumferential velocity that is approximately the same as that in the fifth cavity 52e in the rotor shaft 32. Thus, the cooling air in the large diameter portion end cavity 65 does not cause resistance that hinders rotation of the rotor shaft 32 when flowing into the fifth cavity 52e in the rotor shaft 32.

The pressure of the cooling air introduced into the fifth cavity 52e is approximately 5 ata.

The cooling air in the fifth cavity 52e flows through the fourth stage communicating passage 57a that partially forms the fourth stage blade array passage 49a, and into the cooling air passages in the plurality of blades that constitute the fourth stage blade row 33d. In the process of passing through the fourth stage communicating passage 57a, this cooling air is regulated in pressure and flow rate. As a result, the cooling air immediately prior to flowing from the fourth stage communicating passage 57a into the blades of the fourth stage blade row 33d reaches a pressure of 3 ata. This cooling air passes through the cooling air passages in the plurality of blades that constitute the fourth stage blade row 33d, cools the blades, and then is discharged into the combustion gas flow channel 39.

Thus, in the present embodiment as well, similarly to the first embodiment, it is possible to cool the blades of the turbine 30 by the air extracted from the compressor 10. Furthermore, in the present embodiment as well, it is possible to suppress the driving force of the compressor 10 and thus suppress a reduction in the efficiency of the gas turbine.

Further, in the present embodiment as well, similarly to the first embodiment, the air is increased in pressure in the forced vortex passage 46 formed on the downstream side of the blade row 33 furthest downstream, and is then distributed to each of the plurality of blade rows 33, making it possible to suppress a deterioration in the vibration characteristics of the turbine rotor 31 as well as a reduction in the aerodynamic performance of the turbine 30.

Further, in the first embodiment, the cooling air that cools the second stage blade row 33b and the third stage blade row 33c is introduced into the forced vortex passage 46 in its entirety, and the centrifugal force generated by the rotation of the turbine rotor 31 is then utilized to increase the pressure of the cooling air. On the other hand, in the present embodiment, only the cooling air that cools the second stage blade row 33b and the third stage blade row 33c is introduced into the forced vortex passage 46 and increased in pressure, and the cooling air that cools the fourth stage blade row 33d passes through the pre-swirl nozzle 67 without flowing into the forced vortex passage 46, causing this cooling air to swirl, decreasing a rotation resistance of the turbine rotor 31. Thus, in the present embodiment, the rotation resistance of the turbine rotor 31 becomes less than that in the first embodiment, making it possible to increase the efficiency of the gas turbine.

Further, in the present embodiment, the cooling air for the fourth stage blade row 33d passes through the air extraction branch pipe 88 provided outside the rotor shaft 32, making it possible to easily regulate the flow rate, pressure, and temperature of the cooling air for this fourth stage blade row 33d by providing the air adjustment valve and the cooler to this air extraction branch pipe 88.

Third Embodiment

Figure 8:
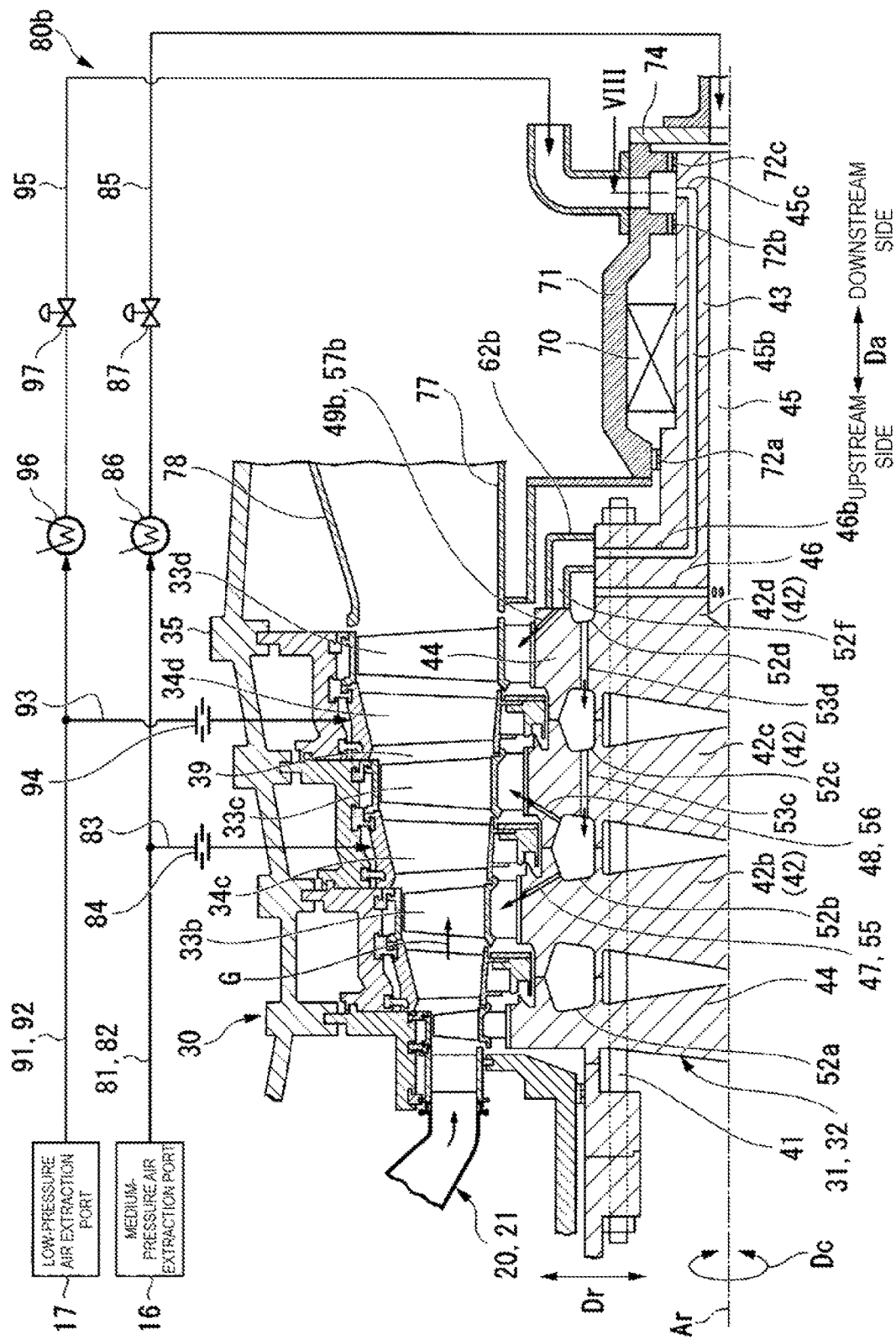
FIG. 8 is a cross-sectional view of a main portion of a gas turbine of a third embodiment according to the present invention.
Figure 9:
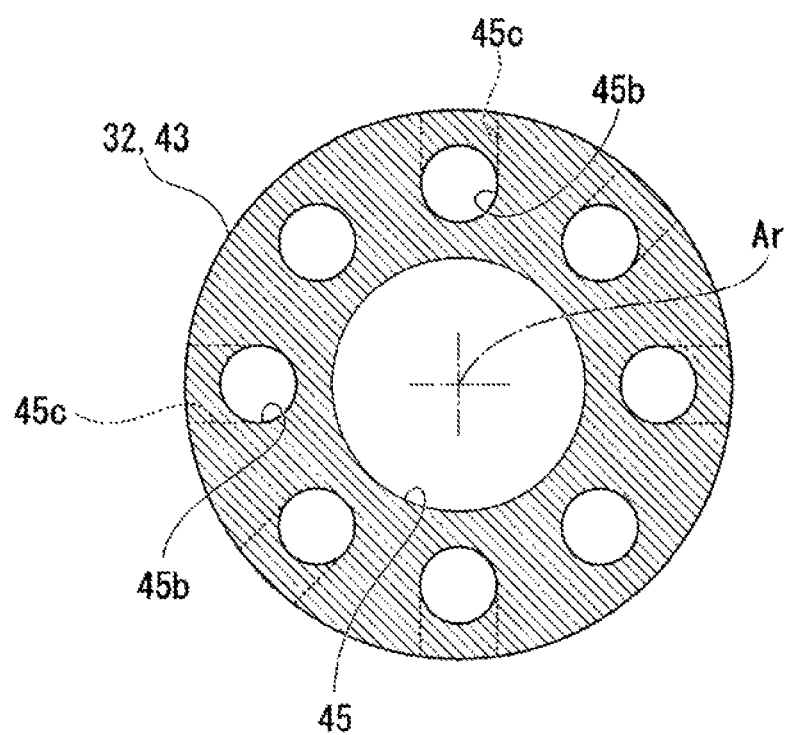
FIG. 9 is a cross-sectional view taken along the line VIII of FIG. 8.
Figure 10:
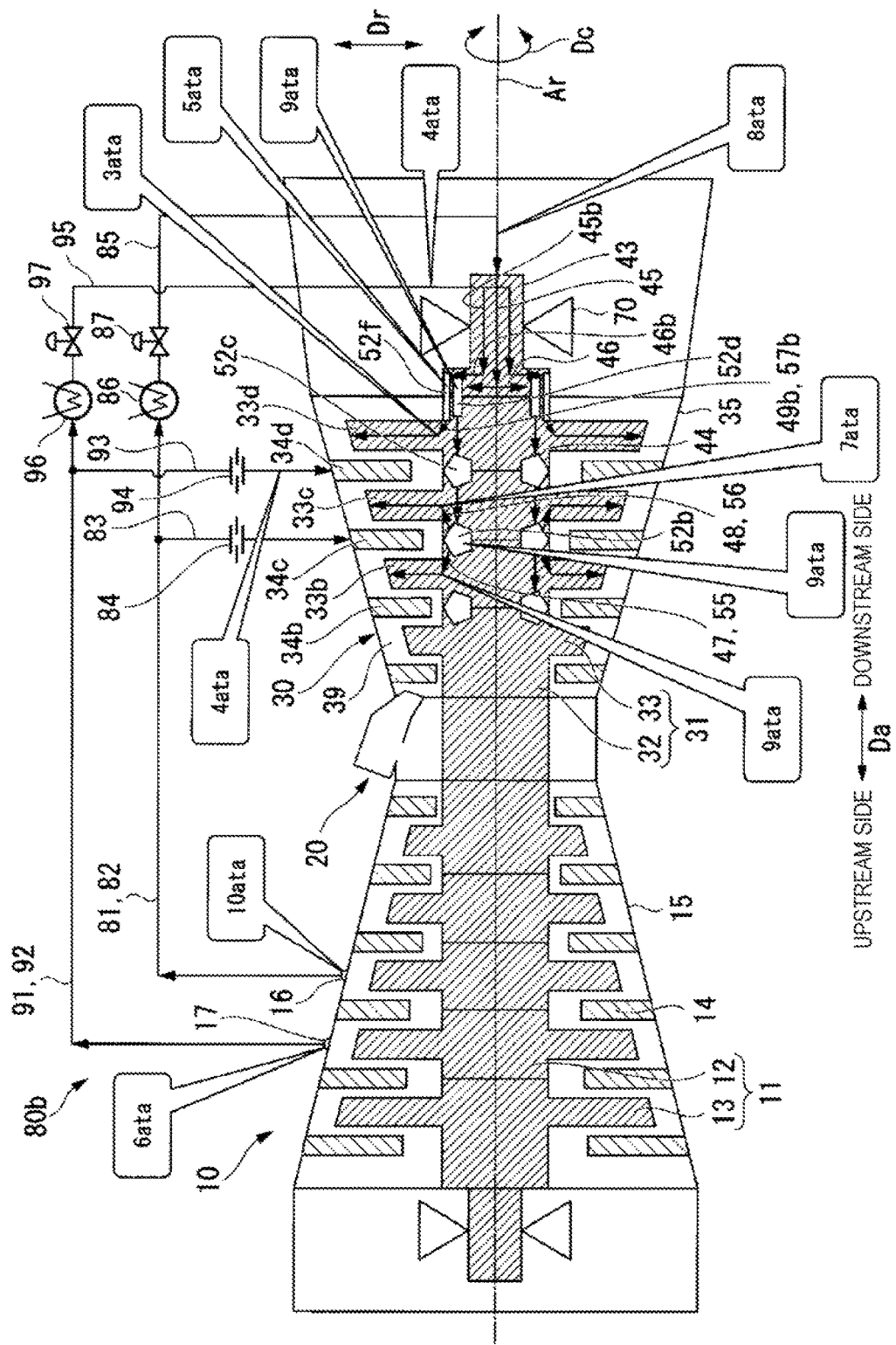
FIG. 10 is an explanatory view illustrating a flow of cooling air and a state quantity thereof in the third embodiment according to the present invention.

The following describes a third embodiment of the gas turbine according to the present invention with reference to FIGS. 8 to 10.

In the gas turbine of both the first and second embodiments, the cooling air extracted from the medium-pressure air extraction port 16 of the compressor 10 is utilized as the cooling air for the second, third, and fourth stage blade rows 33b, 33c, 33d.

In the gas turbine of the present embodiment, as illustrated in FIGS. 8 and 10, the cooling air extracted from the medium-pressure air extraction port 16 (first air extraction port) of the compressor 10 is utilized as the cooling air for the second and third stage blade rows 33b. 33c. Furthermore, in this gas turbine, the cooling air extracted from a low-pressure air extraction port 17 (second air extraction port) of the compressor 10 is utilized as the cooling air for the fourth stage blade row 33d.

The medium-pressure air extraction port 16 and the low-pressure air extraction port 17 are formed in positions corresponding to the intermediate stage of the compressor casing 15 of the present embodiment. The low-pressure air extraction port 17 is formed on the upstream side of the position where the medium-pressure air extraction port 16 is formed. As a result, the pressure of the air extracted from the low-pressure air extraction port 17 is lower than the pressure of the air extracted from the medium-pressure air extraction port 16, and is 6 atm, for example.

An air extraction line 80b of the present embodiment, similarly to the first embodiment, includes the medium-pressure air extraction pipe 81 as well as the cooler 86, the air adjustment valve 87, and the air regulator 84 provided to this medium-pressure air extraction pipe 81. The medium-pressure air extraction pipe 81, similarly to the first embodiment, includes the medium-pressure air extraction main pipe 82 connected to the medium-pressure air extraction port 16 of the compressor 10, and the vane medium-pressure air extraction pipe 83 as well as the blade medium-pressure air extraction pipe 85 connected to the medium-pressure air extraction main pipe 82. The air regulator 84 described above is provided to the vane medium-pressure air extraction pipe 83, and the cooler 86 and the air adjustment valve 87 described above are provided to the blade medium-pressure air extraction pipe 85.

The air extraction line 80b of the present embodiment further includes a low-pressure air extraction pipe 91 as well as a cooler 96, an air adjustment valve 97, and an air regulator 94 provided to this low-pressure air extraction pipe 91. The low-pressure air extraction pipe 91 includes a low-pressure air extraction main pipe 92 connected to the low-pressure air extraction port 17 of the compressor 10, and a vane low-pressure air extraction pipe 93 as well as a blade low-pressure air extraction pipe 95 connected to the low-pressure air extraction main pipe 92.

The vane low-pressure air extraction pipe 93 is connected to a position corresponding to the intermediate stage of the turbine 30 in the turbine casing 35. More specifically, the vane low-pressure air extraction pipe 93 is connected on the downstream side of the position where the vane medium-pressure air extraction pipe 83 is connected, in the turbine casing 35. The air regulator 94, such as an orifice, for regulating the pressure and the flow rate of the air that passes through this vane low-pressure air extraction pipe 93 is provided to the vane low-pressure air extraction pipe 93. The blade low-pressure air extraction pipe 95 is connected to the rotor shaft 32. The cooler 96 and the air adjustment valve 97 described above are provided to this blade low-pressure air extraction pipe 95. The cooler 96 cools the air that passes through this blade low-pressure air extraction pipe 95. The air adjustment valve 97 adjusts the flow rate of the air that passes through this blade low-pressure air extraction pipe 95. An end portion of this blade low-pressure air extraction pipe 95 is fixed to the bearing cover 71.

In the rotor shaft 32 of the present embodiment, similarly to those in the first and second embodiments, the first axial-direction passage 45, the first forced vortex passage 46, the second stage blade array passage 47 (first blade array passage), and the third stage blade array passage 48 (second blade array passage) are formed. The first axial-direction passage 45 is a passage into which cooling air from the medium-pressure air extraction port 16 flows, and extends in the axial direction Da. The first forced vortex passage 46 is connected to the first axial-direction passage 45, and extends outwards in the radial direction. The second stage blade array passage 47 guides the cooling air that passed through the first forced vortex passage 46 to the second stage blade row 33b (first blade row). The third stage blade array passage 48 guides the cooling air that passed through the first forced vortex passage 46 to the third stage blade row 33c (second blade row). Furthermore, in the rotor shaft 32 of the present embodiment, a second axial-direction passage 45b, a second forced vortex passage 46b, and a fourth stage blade array passage 49b (third blade array passage) are formed. The second axial-direction passage 45b is a passage into which cooling air from the low-pressure air extraction port 17 flows, and extends in the axial direction Da. The second forced vortex passage 46b is connected to the second axial-direction passage 45b, and extends outwards in the radial direction. The fourth stage blade array passage 49b guides the cooling air that passed through the second forced vortex passage 46b to the fourth stage blade row 33d (third blade row).

The first cavity 52a, the second cavity, the third cavity 52c, and the fourth cavity 52d are formed in the large diameter portion 44 of the rotor shaft 32, similarly to the large diameter portion 44 of the rotor shaft 32 of the first and second embodiments. The fourth cavity 52d is connected to the end portion on the outer side in the radial direction of the first forced vortex passage 46. The fourth cavity 52d and the third cavity 52c are connected by the fourth disc passage 53d, and the third cavity 52c and the second cavity 52b are connected by the third disc passage 53c. The second cavity 52b and the third stage blade row 33c are connected by the third stage communicating passage 56, and the second cavity 52b and the second stage blade row 33b are connected by the second stage communicating passage 55.

Thus, in the present embodiment as well, the third stage blade array passage 48 is formed by the fourth cavity 52d, the fourth disc passage 53d, the third cavity 52c, the third disc passage 53c, the second cavity 52b, and the third stage communicating passage 56. Further, the second stage blade array passage 47 is formed by the fourth cavity 52d, the fourth disc passage 53d, the third cavity 52c, the third disc passage 53c, the second cavity 52b, and the second stage communicating passage 55.

The second axial-direction passage 45b, as illustrated in FIGS. 8 and 9, is formed in a position on the outer side in the radial direction with respect to the first axial-direction passage 45 that extends in the axial direction Da with the axial line Ar serving as the center. A low-pressure air receiving passage 45c is formed on a downstream end of the second axial-direction passage 45b. This low-pressure air receiving passage 45c extends outwards in the radial direction from this downstream end, and opens at the outer peripheral surface of the small diameter portion 43.

In the bearing cover 71, a through-hole that penetrates the bearing cover 71 from an outer peripheral side to an inner peripheral side is formed in substantially the same position as the opening of the low-pressure air receiving passage 45c in the axial direction Da. The end portion of the blade low-pressure air extraction pipe 95 is fixed at the position where this through-hole is formed. The upstream side and the downstream side of the through-hole of the bearing cover 71, between the inner peripheral side of the bearing cover 71 and the outer peripheral side of the small diameter portion 43, are sealed by seal members 72b. 72c, respectively.

The outer side in the radial direction of the large diameter portion 44, which is the downstream side, is covered by a large diameter portion end cover 62b. A fifth cavity 52f having an annular shape with the axial line Ar serving as the center is formed between the large diameter portion end cover 62b and the large diameter portion 44.

The second forced vortex passage 46b that extends outwards in the radial direction from an upstream end of the second axial-direction passage 45b and communicates with the fifth cavity 52f is connected to the upstream end of the second axial-direction passage 45b. This second forced vortex passage 46b is formed in a position on the downstream side of the first forced vortex passage 46 in the large diameter portion 44. A fourth stage communicating passage 57b that communicates with the fifth cavity 52f and an attachment position of the fourth stage blade row 33d is formed in the large diameter portion 44.

Thus, the fourth stage blade array passage 49b in the present embodiment is formed by the fifth cavity 52f and the fourth stage communicating passage 57b.

Next, the flow of the cooling air in the gas turbine described above will be described.

The cooling air extracted from the medium-pressure air extraction port 16 of the compressor 10 and introduced into the blade medium-pressure air extraction pipe 85 is, similarly to the first and second embodiments, cooled in the process of passing through the cooler 86, adjusted in flow rate by the air adjustment valve 87, and then introduced into the first axial-direction passage 45 of the rotor shaft 32. The cooling air immediately prior to introduction into the first axial-direction passage 45 reduces in pressure to about 8 ata as illustrated in FIG. 10, and reduces in temperature as well.

The cooling air introduced into the first axial-direction passage 45, similarly to the first and second embodiments, flows through the first forced vortex passage 46 that extends outwards in the radial direction from this first axial-direction passage 45, and into the fourth cavity 52d. In the process of passing through the forced vortex passage 46 that extends outwards in the radial direction, the cooling air is subjected to a centrifugal force from the rotor shaft 32 that rotates around the axial line Ar, increasing in pressure. As a result, the pressure of the cooling air that reached the fourth cavity 52d is 9 ata. Note that the cooling air in the fourth cavity 52d rises in temperature due to increased pressure.

The cooling air in the fourth cavity 52d flows through the fourth disc passage 53d, the third cavity 52c, and the third disc passage 53c, and into the second cavity 52b. The pressure of the cooling air in the second cavity 52b is approximately the same as the pressure of the cooling air in the fourth cavity 52d at 9 ata, and the temperature of this cooling air is approximately the same as the temperature of the cooling air in the fourth cavity 52d.

A portion of the cooling air introduced into the second cavity 52b, similarly to the first and second embodiments, flows through the third stage communicating passage 56 that partially forms the third stage blade array passage 48, and into the cooling air passages in the plurality of blades that constitute the third stage blade row 33c. In the process of passing through the third stage communicating passage 56, this cooling air is regulated in pressure and flow rate. As a result, the cooling air immediately prior to flowing from the third stage communicating passage 56 into the blades of the third stage blade row 33c reaches a pressure of approximately 7 ata. This cooling air passes through the cooling air passages in the plurality of blades that constitute the third stage blade row 33c, cools the blades, and then is discharged into the combustion gas flow channel 39.

The remaining portion of the cooling air introduced into the second cavity 52b, similarly to the first embodiment, flows through the second stage communicating passage 55 that partially forms the second stage blade array passage 47, and into the cooling air passages in the plurality of blades that constitute the second stage blade row 33b. In the process of passing through the second stage communicating passage 55, this cooling air is regulated in pressure and flow rate. As a result, the cooling air immediately prior to flowing from the second stage communicating passage 55 into the blades of the second stage blade row 33b reaches a pressure of approximately 9 ata. This cooling air passes through the cooling air passages in the plurality of blades that constitute the second stage blade row 33b, cools the blades, and then is discharged into the combustion gas flow channel 39.

The cooling air extracted from the low-pressure air extraction port 17 of the compressor 10 flows through the low-pressure air extraction main pipe 92 of the air extraction line 80b. A portion of the cooling air then flows into the vane low-pressure air extraction pipe 93 while a remaining portion flows into the blade low-pressure air extraction pipe 95. The cooling air introduced into the vane low-pressure air extraction pipe 93 reaches a pressure of 4 ata in the process of passing through the air regulator 94, is supplied to the plurality of vanes that constitute the fourth stage vane row 34d, and cools the plurality of vanes.

The cooling air introduced into the blade low-pressure air extraction pipe 95 is cooled in the process of passing through the cooler 96, adjusted in flow rate by the air adjustment valve 97, and then introduced into the second axial-direction passage 45b of the rotor shaft 32. Owing to the pressure loss in the process of passing through the cooler 96 and the air adjustment valve 97 and the like, the cooling air immediately prior to introduction into the second axial-direction passage 45b reduces in pressure to about 4 ata. Further, the cooling air immediately prior to introduction into the second axial-direction passage 45b is cooled by the cooler 86.

The cooling air introduced into the second axial-direction passage 45b flows through the second forced vortex passage 46b that extends outwards in the radial direction from this second axial-direction passage 45b, and into the fifth cavity 52f. In the process of passing through the second forced vortex passage 46b that extends outwards in the radial direction, the cooling air is subjected to the centrifugal force from the rotor shaft 32 that rotates around the axial line Ar, increasing in pressure. As a result, the pressure of the cooling air that reached the fifth cavity 52f is 5 ata.

The cooling air in the fifth cavity 52f flows through the fourth stage communicating passage 57b that partially forms the fourth stage blade array passage 49b, and into the cooling air passages in the plurality of blades that constitute the fourth stage blade row 33d. In the process of passing through the fourth stage communicating passage 57b, this cooling air is regulated in pressure and flow rate. Further, this cooling air increases in an amount of heat exchange with the heat of the combustion gas as the cooling air nears the combustion gas flow channel 39, gradually increasing in temperature. As a result, the cooling air immediately prior to flowing from the fourth stage communicating passage 57b into the blades of the fourth stage blade row 33d reaches a pressure of 3 ata. This cooling air passes through the cooling air passages in the plurality of blades that constitute the fourth stage blade row 33d, cools the blades, and then is discharged into the combustion gas flow channel 39.

Thus, in the present embodiment as well, similarly to the first and second embodiments, it is possible to cool the blades of the turbine 30 by the air extracted from the compressor 10. Furthermore, in the present embodiment as well, it is possible to suppress the driving force of the compressor 10 and thus suppress a reduction in the efficiency of the gas turbine.

Further, in the present embodiment, the first and second forced vortex passages 46, 46b are formed on the downstream side of the blade row 33 furthest downstream, and the air is increased in pressure in the first forced vortex passage 46 and then distributed to the second stage blade row 33b and the third stage blade row 33c. As a result, in the present embodiment as well, elongation of the length of the rotor shaft 32 and the distance between stages is suppressed, making it possible to suppress a deterioration in the vibration characteristics of the rotor and a reduction in the aerodynamic performance of the turbine 30.

In the present embodiment, cooling air having a pressure lower than the pressure of the cooling air supplied to the second stage blade row 33b and the third stage blade row 33c can be supplied to the fourth stage blade row 33d. Moreover, in the present embodiment, the air extracted from the compressor 10 is introduced into the rotating rotor shaft 32 and a forced vortex of the cooling air is produced in this rotor shaft 32, thereby increasing the pressure of the cooling air. This air is then supplied to the fourth stage blade row 33d. As a result, in the present embodiment, it is possible to extract air having a pressure lower than that of the air from the medium-pressure air extraction port 16 from the low-pressure air extraction port 17 as cooling air, and utilize this air as the cooling air for the fourth stage blade row 33d. Thus, in the present embodiment, the compression ratio of the cooling air for the fourth stage blade row 33d can be decreased by the compressor 10, making it possible to suppress the driving force of the compressor 10. Thus, in the present embodiment, it is possible to increase the efficiency of the gas turbine to a greater extent than in the first embodiment.

Modification of Third Embodiment

Figure 11:
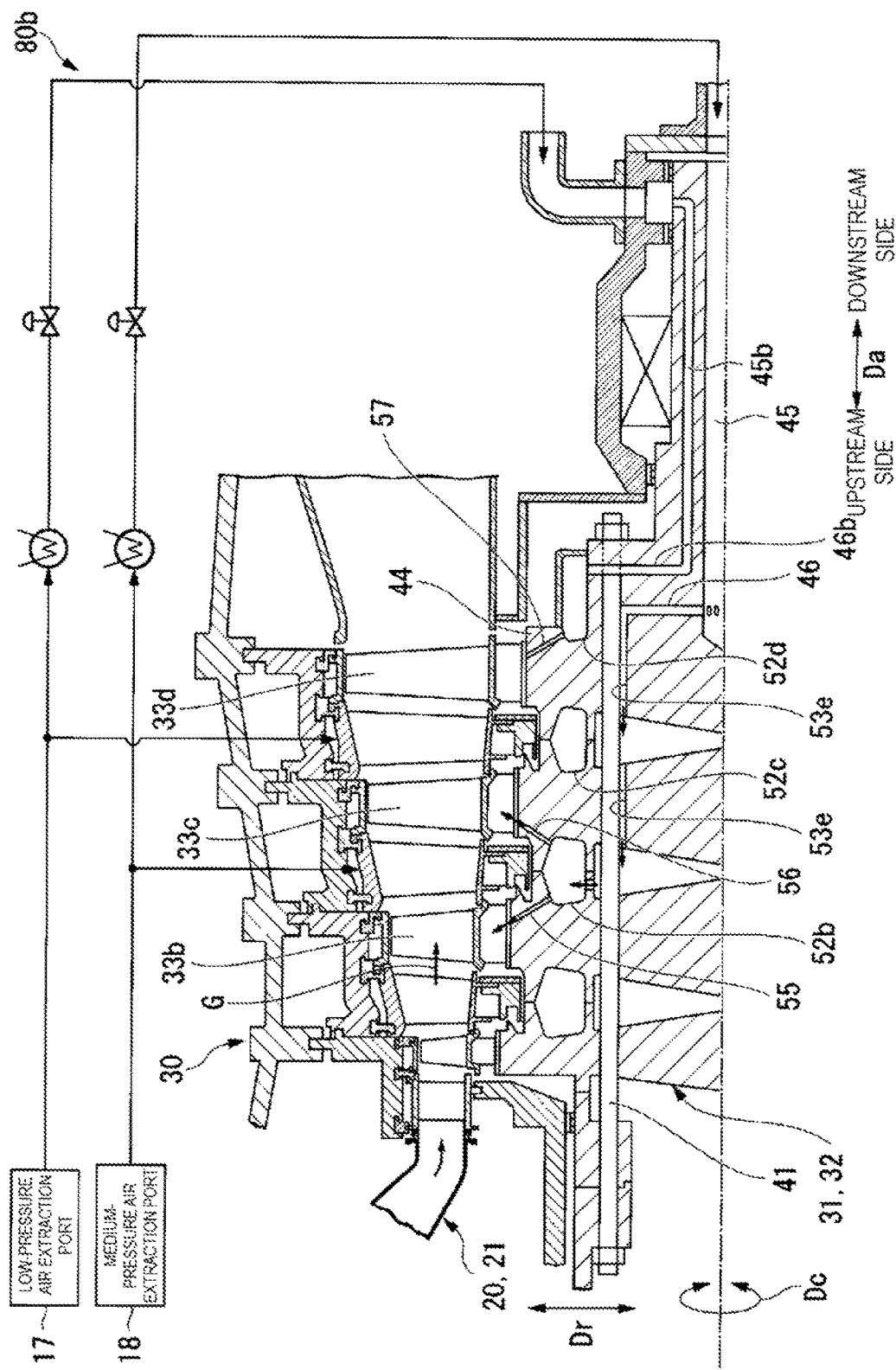
FIG. 11 is a cross-sectional view of a main portion of a gas turbine of a modification of the third embodiment according to the present invention.

A modification of the third embodiment will be described with reference to FIG. 11.

In the third embodiment, the end portion on the outer side in the radial direction of the first forced vortex passage 46 is connected to the fourth cavity 52d. The fourth cavity 52d is connected to the second cavity 52b via the fourth disc passage 53d, the third cavity 52c, and the third disc passage 53c. This second cavity 52b is connected to the second stage blade row 33b via the second stage communicating passage 55, and to the third stage blade row 33c via the third stage communicating passage 56.

In the present modification, a bolt hole 41c of the rotor shaft 32 through which the spindle bolt 41 is inserted is given an elliptical cross-sectional shape, and a gap in the bolt hole 41c through which the spindle bolt 41 is inserted serves as a passage 53e for cooling air. This passage 53c, similarly to the spindle bolt 41, extends in the axial direction Da. The end portion on the outer side in the radial direction of the first forced vortex passage 46 is connected to a downstream end of this passage 53e. Further, the second cavity 52b is connected to an upstream end of this passage 53e. This second cavity 52b, similarly to each of the embodiments described above, is connected to the second stage blade row 33b via the second stage communicating passage 55, and to the third stage blade row 33c via the third stage communicating passage 56.

Further, in the present modification, the fourth cavity 52d is connected to the end portion on the outer side in the radial direction of the second forced vortex passage 46b. This fourth cavity 52d is connected to the fourth stage blade row 33d via the fourth stage communicating passage 57.

In this way, the passage that connects the forced vortex passage and each of the blade rows may be formed as appropriate in accordance with a structure of the turbine rotor.

Other Modifications

While the air adjustment valves 87, 97 and the coolers 86, 96 are provided to the blade medium-pressure air extraction pipe 85 of the first, second, and third embodiments and to the blade low-pressure air extraction pipe 95 of the third embodiment, these are not required. Thus, the air adjustment valves 87, 97 and the coolers 86, 96 of these air extraction pipes may be omitted as appropriate.

Further, in the above-described embodiments, the forced vortex passage 46 through which cooling air for the plurality of blade rows 33 passes is disposed on the downstream side of the blade row 33 furthest downstream. Nevertheless, the forced vortex passage 46 may be formed between any of the stages in the large diameter portion 44 of the rotor shaft 32. In this case as well, at the end on the outer side in the radial direction of the forced vortex passage 46, this passage 46 is branched to each of the plurality of blade rows 33, thereby making it possible to decrease the number of forced vortex passages 46 and, as a result, suppress elongation of the length of the rotor shaft 32 and extension of the distance between the plurality of stages. However, the forced vortex passage 46 is preferably formed on the downstream side of the blade row 33 furthest downstream as in the above-described embodiments from the viewpoint of suppressing extension of the distance between all the stages.

Further, in each of the embodiments described above, the air extraction ports 16, 17 are formed in the compressor casing 15, and the air extraction line 80 is disposed outside the compressor casing 15 and outside the turbine casing 35. Nevertheless, the air extraction port may be formed in the compressor rotor 11, and an axial-direction passage that extends in the axial direction Da inside the compressor rotor 11 and the turbine rotor 31 may be connected to this air extraction port, for example.

INDUSTRIAL APPLICABILITY

According to one aspect of the present invention, it is possible to cool a blade using cooling air from a compressor and, at the same time, suppress elongation of a rotor shaft and thus suppress a deterioration in vibration characteristics of a rotor.

REFERENCE SIGNS LIST

1 Gas turbine rotor
5 Gas turbine casing
10 Compressor
11 Compressor rotor
12 Rotor shaft
13 Blade row
14 Vane row
15 Compressor casing
16 Medium-pressure air extraction port (first air extraction port)
17 Low-pressure air extraction port (second air extraction port)
19 Air compression flow channel
20 Combustor
30 Turbine
31 Turbine rotor
32 Rotor shaft
33 Blade row
33a First stage blade row
33b Second stage blade row (first blade row)
33c Third stage blade row (second blade row)
33d Fourth stage blade row (third blade row)
34 Vane row
35 Turbine casing
39 Combustion gas flow channel
43 Small diameter portion
44 Large diameter portion
45 Axial-direction passage (first axial-direction passage)
45b Second axial-direction passage
46 Forced vortex passage (first forced vortex passage)
46b Second forced vortex passage
47 Second stage blade array passage (first blade array passage)
48 Third stage blade array passage (second blade array passage)
49, 49a, 49b Fourth stage blade array passage (third blade array passage)
52a First cavity
52b Second cavity
52c Third cavity
52d Fourth cavity
52e, 52f Fifth cavity
65 Large diameter portion end cavity
66 Air receiving space
67 Pre-swirl nozzle
70 Bearing
71 Bearing cover
80, 80b Air extraction line
81 Medium-pressure air extraction pipe
88 Air extraction branch pipe
91 Low-pressure air extraction pipe

The invention claimed is:

1. A gas turbine, comprising:
a compressor that compresses air;
a combustor that combusts fuel in the air compressed by the compressor to generate combustion gas;
a medium-pressure air extraction pipe; and a turbine that is driven by the combustion gas,
wherein the compressor is configured to have an air extraction port that extracts air from an intermediate stage of the compressor as cooling air,
the turbine is configured to have a rotor shaft, a plurality of blade rows that are arranged in an axial direction of the rotor shaft and each include a plurality of blades attached to an outer circumference of the rotor shaft, and a plurality of vane rows that are arranged in the axial direction, the blade rows and the vane rows being arranged in an alternating manner in the axial direction, each vane row being disposed on an upstream side of a respectively adjacent one of the blade rows,
the medium-pressure air extraction pipe is configured to have a medium-pressure air extraction main pipe connected to the air extraction port of the compressor, and a vane medium-pressure air extraction pipe and a blade medium-pressure air extraction pipe which are connected to the medium-pressure air extraction main pipe,
the rotor shaft comprises an axial-direction passage, a forced vortex passage, a first blade array passage, and a second blade array passage,
the axial-direction passage extending in the axial direction is connected to the blade medium-pressure air extraction pipe,
the forced vortex passage extending outwards in a radial direction of the rotor shaft from a connecting portion between the forced vortex passage and the axial-direction passage is connected to the axial-direction passage,
the first blade array passage is connected to an end portion on an outer side in the radial direction of the forced vortex passage and configured to guide the cooling air to a first blade row among the plurality of blade rows,
the second blade array passage is connected to an end portion on the outer side in the radial direction of the forced vortex passage and configured to guide the cooling air to a second blade row among the plurality of blade rows, the second blade array passage being on a downstream side of the first blade array passage,
the vane medium-pressure air extraction pipe is connected to one of the vane rows, the one of the vane rows being disposed between the first blade row and the second blade row in the axial direction,
the first blade array passage comprises a first communicating passage configured to guide the cooling air from a cavity toward the first blade row, the cavity being an annular space with the rotor shaft serving as the center, the cavity being formed between a first disc on which the first blade row is arranged and a second disc on which the second blade row is arranged, and
the second blade array passage comprises a second communicating passage configured to guide the cooling air from the cavity toward the second blade row,
the forced vortex passage is provided on the downstream side of the cavity which is the annular space, and is connected to the cavity via a first disc passage extending in the axial direction and a second disc passage extending in the axial direction, the second disc passage being directly connected to the cavity, the first and second disc passages being in communication with each other.

2. The gas turbine according to claim 1, wherein:
the forced vortex passage is formed on a downstream side of a third blade row among the plurality of blade rows, the third blade row being disposed on a furthest downstream side of a flow of the combustion gas in the axial direction.

3. The gas turbine according to claim 2, further comprising: an air extraction branch pipe connected to the medium-pressure air extraction pipe; and a pre-swirl nozzle that is connected to the air extraction branch pipe and imparts a speed component in a rotational direction of the rotor shaft to the cooling air that flowed through the air extraction branch pipe, a third blade array passage that guides the cooling air that passed through the pre-swirl nozzle to the third blade row, among the plurality of blade rows, disposed on the furthest downstream side of the flow of the combustion gas in the axial direction being formed in the rotor shaft.

4. The gas turbine according to claim 2, wherein: the compressor includes a second air extraction port that extracts air as cooling air from an intermediate stage further on an upstream side of the flow of the air inside the compressor than the air extraction port that extracts air from the intermediate stage of the compressor as cooling air; and a second axial-direction passage, a second forced vortex passage, and a third blade array passage are formed in the rotor shaft, the second axial-direction passage being connected to the second air extraction port and extending in the axial direction on the outer side in the radial direction with respect to a first axial-direction passage serving as the axial-direction passage, the second forced vortex passage being connected to the second axial-direction passage, and extending outwards in the radial direction from the second axial-direction passage on the downstream side of the third blade row, among the plurality of blade rows, disposed on the furthest downstream side of the flow of the combustion gas in the axial direction, the third blade array passage being connected to an end portion on the outer side in the radial direction of the second forced vortex passage, and configured to guide the cooling air to the third blade row.

5. The gas turbine according to claim 1, further comprising: an air extraction branch pipe connected to the medium-pressure air extraction pipe; and a pre-swirl nozzle that is connected to the air extraction branch pipe and imparts a speed component in a rotational direction of the rotor shaft to the cooling air that flowed through the air extraction branch pipe, a third blade array passage that guides the cooling air that passed through the pre-swirl nozzle to a third blade row, among the plurality of blade rows, disposed on a furthest downstream side of the flow of the combustion gas in the axial direction being formed in the rotor shaft.

6. The gas turbine according to claim 1, wherein: the compressor includes a second air extraction port that extracts air as cooling air from an intermediate stage further on an upstream side of the flow of the air inside the compressor than the air extraction port that extracts air from the intermediate stage of the compressor as cooling air; and a second axial-direction passage, a second forced vortex passage, and a third blade array passage are formed in the rotor shaft, the second axial-direction passage being connected to the second air extraction port and extending in the axial direction on the outer side in the radial direction with respect to a first axial-direction passage serving as the axial-direction passage, the second forced vortex passage being connected to the second axial-direction passage, and extending outwards in the radial direction from the second axial-direction passage on the downstream side of a third blade row, among the plurality of blade rows, disposed on a furthest downstream side of the flow of the combustion gas in the axial direction, the third blade array passage being connected to an end portion on the outer side in the radial direction of the second forced vortex passage, and configured to guide the cooling air to the third blade row.

7. The gas turbine according to claim 1, wherein a pressure loss of the cooling air passing through the second communicating passage is higher than a pressure increase due to a centrifugal force in the second communicating passage, and the pressure of the cooling air immediately prior to flowing from the second communicating passage to the second blade row is decreased with respect to the pressure of the cooling air in the cavity.

* * * * *